US012178758B2

(12) United States Patent
Hoadley et al.

(10) Patent No.: US 12,178,758 B2
(45) Date of Patent: Dec. 31, 2024

(54) LITTER PLATFORM SUPPORT AND POSITIONING SYSTEM

(71) Applicant: AIR METHODS, LLC, Greenwood Village, CO (US)

(72) Inventors: Matthew Hoadley, Parker, CO (US); Arthur E. Torwirt, Parker, CO (US); Robert K. Brodin, Castle Rock, CO (US); Ryan Neal Mecklem, Parker, CO (US)

(73) Assignee: AIR METHODS, LLC, Greenwood Village, CO (US)

( * ) Notice: Subject to any disclaimer, the term of this patent is extended or adjusted under 35 U.S.C. 154(b) by 0 days.

(21) Appl. No.: 17/373,604

(22) Filed: Jul. 12, 2021

(65) Prior Publication Data

US 2022/0008265 A1 Jan. 13, 2022

Related U.S. Application Data

(60) Provisional application No. 62/705,695, filed on Jul. 10, 2020.

(51) Int. Cl.
*A61G 1/06* (2006.01)
*A61G 1/04* (2006.01)
(Continued)

(52) U.S. Cl.
CPC ............. *A61G 1/06* (2013.01); *A61G 1/04* (2013.01); *A61G 3/0825* (2013.01);
(Continued)

(58) Field of Classification Search
CPC ............ B64D 2011/0092; B64D 11/00; B64D 9/00; B64D 11/06; B64D 11/0696;
(Continued)

(56) References Cited

U.S. PATENT DOCUMENTS 5,274,864 A 1/1994 Morgan
5,372,339 A * 12/1994 Morgan ................... B64D 9/00
296/19
(Continued)

FOREIGN PATENT DOCUMENTS

AU 1993051704 4/1994
AU 1994053263 5/1994
(Continued)

OTHER PUBLICATIONS

International Search Report and Written Opinion of the International Searching Authority, issued in connection with Int'l Appl. No. PCT/US21/41329, dated Oct. 26, 2021 (9 pages).

*Primary Examiner* — David R Hare
*Assistant Examiner* — Deborah Talitha Gedeon
(74) *Attorney, Agent, or Firm* — Holland & Hart LLP

(57) ABSTRACT

The present disclosure includes litter platform support and positioning systems described generally comprising at least one lift column mounted to an interior floor in an emergency vehicle or structure. The lift column is connected to at least one support assembly, the at least one support assembly adapted to receive and position a litter assembly. In some implementations, the support assembly is connected to the lift column and adapted to independently adjust the litter assembly vertically, laterally, longitudinally, and rotate 360°. The litter platform support and positioning system further includes at least one individual motor associated with each lift column which is operatively connected to a drive screw to independently adjust and control the location of each support assembly to individually position a corresponding litter platform assembly.

18 Claims, 24 Drawing Sheets

(51) Int. Cl.
 *A61G 3/08* (2006.01)
 *B64D 11/00* (2006.01)
(52) U.S. Cl.
 CPC .......... *A61G 3/0841* (2013.01); *A61G 3/0858* (2013.01); *A61G 3/0866* (2013.01); *A61G 2220/10* (2013.01); *A61G 2220/14* (2013.01); *B64D 2011/0092* (2013.01)
(58) Field of Classification Search
 CPC .... B64D 11/064; B64D 11/0697; A61G 3/00; A61G 1/06; A61G 2220/10; A61G 2220/14; A61G 3/0825; A61G 3/0841; A61G 3/085; A61G 3/0866; A61G 3/0858; A61G 3/0883; A61G 3/0875; A61G 2220/00; A61G 2220/12; A61G 3/0209; A61G 1/04; A47D 5/003; A47C 17/80; B60N 2/24; B60N 2/3013; B60N 2/4242; B60N 2/34; B60N 2/04; B60N 2/0735; B60N 2/0742; B60N 2/0745; B60N 2/10; B60N 2/12; B60N 2/3015; B60N 2/3047; B60N 2/42736; A61B 6/04; B60P 3/39; B60P 1/4428
 See application file for complete search history.

(56) References Cited

U.S. PATENT DOCUMENTS

| | | | |
|---|---|---|---|
| 5,383,629 A | 1/1995 | Morgan | |
| 5,738,306 A | 4/1998 | Moss et al. | |
| 5,785,277 A | 7/1998 | Manning et al. | |
| 5,810,178 A | 9/1998 | Boette et al. | |
| 5,827,022 A | 10/1998 | Tovani | |
| 6,152,401 A | 11/2000 | Green | |
| 8,336,939 B2 | 12/2012 | Green et al. | |
| 8,602,475 B2* | 12/2013 | Fletcher | B60N 2/34 296/19 |
| 8,714,504 B2* | 5/2014 | Vuorenoja | A61G 3/0833 5/507.1 |
| 9,126,673 B1 | 9/2015 | Green et al. | |
| 2008/0023976 A1* | 1/2008 | Myers | A61G 3/0891 296/19 |
| 2009/0255058 A1* | 10/2009 | Chinn | A61G 3/085 5/118 |
| 2011/0260482 A1* | 10/2011 | Bourgraf | B60N 2/0745 296/19 |
| 2012/0006873 A1 | 1/2012 | Chinn | |
| 2012/0080899 A1 | 4/2012 | Green et al. | |
| 2014/0034061 A1* | 2/2014 | Marle | A61B 6/4494 128/845 |
| 2020/0170861 A1* | 6/2020 | Shakespeare | A61G 7/1074 |

FOREIGN PATENT DOCUMENTS

| | | | |
|---|---|---|---|
| AU | 1996074301 | 4/1997 | |
| WO | 94/07744 A1 | 4/1994 | |
| WO | 94/08542 A1 | 4/1994 | |
| WO | WO-9713684 A1 * | 4/1997 | .............. A61G 3/00 |
| WO | 2012/047858 A1 | 4/2012 | |
| WO | 2022/011353 A1 | 1/2022 | |

* cited by examiner

LITTER PLATFORM SUPPORT AND POSITIONING SYSTEM

CROSS REFERENCE TO RELATED APPLICATION

This application claims priority to and the benefit of U.S. Provisional Patent Application No. 62/705,695, filed Jul. 10, 2020, and entitled LITTER PLATFORM SUPPORT AND POSITIONING SYSTEM, the disclosure of which is incorporated herein by reference in its entirety.

FIELD OF TECHNOLOGY

This disclosure relates to litter platform support and positioning systems.

BACKGROUND

In emergency medical service applications, air ambulances, such as helicopters, have been used for emergency transfer and treatment of patients. Often such service involves transporting multiple patients and access to patients requiring immediate attention and treatment.

Various methods have been employed to transport patients in a helicopter. For example, in various medical systems, the patient is placed on a stretcher or litter which is attached to the floor or a fixed bench within the helicopter. These systems have proved unsatisfactory in several respects. First, in order for the emergency medical services attendants or paramedics to work on the patient, they must get down on the floor, creating an awkward working posture. Second, the interior space may be generally cramped and the attendants or paramedics in their crouched position generally take up more space than they would while sitting upright.

In order to alleviate the problems associated with the above referenced systems, several medical systems have been employed in helicopter interiors which place the patient at a more comfortable level for the attendants or paramedics to work, as well as freeing up floor space within the emergency vehicle interior. These systems are, however, quite limited in usefulness and suffer from other considerable drawbacks. For example, numerous helicopters and/or fixed wing aircraft merely employ tiers of stationery litter racks. There is generally no mechanism to assist in the loading of upper litter racks, nor any means for moving the rack or racks in various orientations. Many of these systems also require an unacceptable level of manpower, physical effort, and loading time which may be crucial.

SUMMARY

The disclosed technology includes a litter platform support and positioning system for use in a vehicle, such as a helicopter, which is self-contained, space efficient, requires less moving parts, is more resilient during operation and emergency load conditions, permits free full body movement of a person on a litter platform assembly without fear of loose clothing or foreign objects binding or stopping the lift motion, and provides for full movement of at least one litter platform assembly in the disclosed system.

In some implementations, the litter platform support and positioning system is multi-tiered and generally includes a plurality of support means arranged to support a plurality of vertically spaced litters. The litter platform support and positioning system also includes adjustment means which are adapted to independently adjust the support means for controlling the movement of the litters in multiple directions, including vertical, horizontal, and rotational directions as well as controlling the height and the spacing between the litter assemblies.

The disclosed technology may include a litter platform positioning and support system, including at least one litter platform assembly, at least one lift support assembly, each lift support assembly connected to a corresponding litter platform assembly and adapted to independently adjust the position of corresponding litter platform assembly in at least one of a lateral direction and a longitudinal direction, a lift column mounted to an interior ceiling, floor, and/or wall and connected to at least one lifter support assembly, and an electric drive motor operatively coupled to and adapted to rotate a drive screw to independently adjust and control the location of each litter support assembly to individually position the corresponding litter platform assembly.

In some implementations, each lift support assembly is further adapted to independently rotate the position of the corresponding litter platform assembly up to 360°. In some implementations, at least one litter support assembly is further adapted to independently adjust a corresponding litter platform assembly in a vertical position.

In some implementations, the at least one litter support assembly is further connected to a corresponding litter platform assembly and adapted to independently adjust a corresponding litter platform assembly in a tilted position. In some implementations, the torso only may be elevated (e.g., up to 80 degrees).

In some implementations, the electric drive motor is operatively coupled to each drive screw for rotating the drive screw to individually position each litter support assembly to independently adjust and control the elevation of each litter platform assembly. The electric drive motor may be operatively coupled to each drive screw for rotating the drive screw to individually position each litter support assembly to independently adjust and control an axial rotation of each litter platform assembly. The electric drive motor may be operatively coupled to each drive screw for rotating the drive screw to individually position each litter support assembly to independently adjust and control a lateral translation of each litter platform assembly. The electric drive motor operatively may be coupled to each drive screw for rotating the drive screw to individually position each litter support assembly to independently adjust and control a longitudinal translation of each litter platform assembly.

In some implementations, each litter support assembly includes at least one of arms and a platform. The litter support assembly may include a mounting tray spanning between the arms. In some implementations, a carrier block attaching the litter support assembly to a drive screw and lift column rails.

In some implementations, the lift column may include a spring curtain to cover moving parts internal to the lift column. The lift column may include end blocks located at both ends of the lift column.

In some implementations, the lift column is mounted to an interior floor, ceiling and/or wall of a vehicle. In some implementations, the vehicle is one of a helicopter, an airplane, an ambulance, a truck, a container, a trailer, and a room.

In some implementations, the disclosed technology includes an emergency medical vehicle system including a vehicle, and a litter platform positioning and support system, the litter platform positioning and support system including at least one litter platform assembly, at least one support assembly, each support assembly connected to a corresponding litter platform assembly and adapted to independently adjust the position of corresponding litter platform assembly in at least one of a lateral direction and a longitudinal direction, a lift column mounted to an interior floor of the vehicle and connected to at least one support assembly, and an electric drive motor operatively coupled to and adapted to rotate a drive screw to independently adjust and control the location of each support assembly to individually position the corresponding litter platform assembly. In some implementations, each support assembly is further adapted to independently rotate the position of the corresponding litter platform assembly up to 360°.

In some implementations, the disclosed technology includes a multi-patient lift system having a plurality of litter platform assemblies, a plurality of litter support assemblies, each litter support assembly connected to a corresponding litter platform assembly and adapted to independently rotate the position of the corresponding litter platform assembly.

In some implementations, a lift column is mounted to an interior of a vehicle and connected to the plurality of litter support assemblies, and an electric drive motor is operatively coupled to and adapted to independently adjust and control the location of each litter support assembly to individually position the corresponding litter platform assembly.

In some implementations, each litter support assembly is further adapted to independently adjust the position of corresponding litter platform assembly in a lateral direction. Each litter support assembly may be further adapted to independently adjust the position of corresponding litter platform assembly in a longitudinal direction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

These and various other features and advantages will be apparent from a reading of the following Detailed Description.

DETAILED DESCRIPTION

Figure 1:
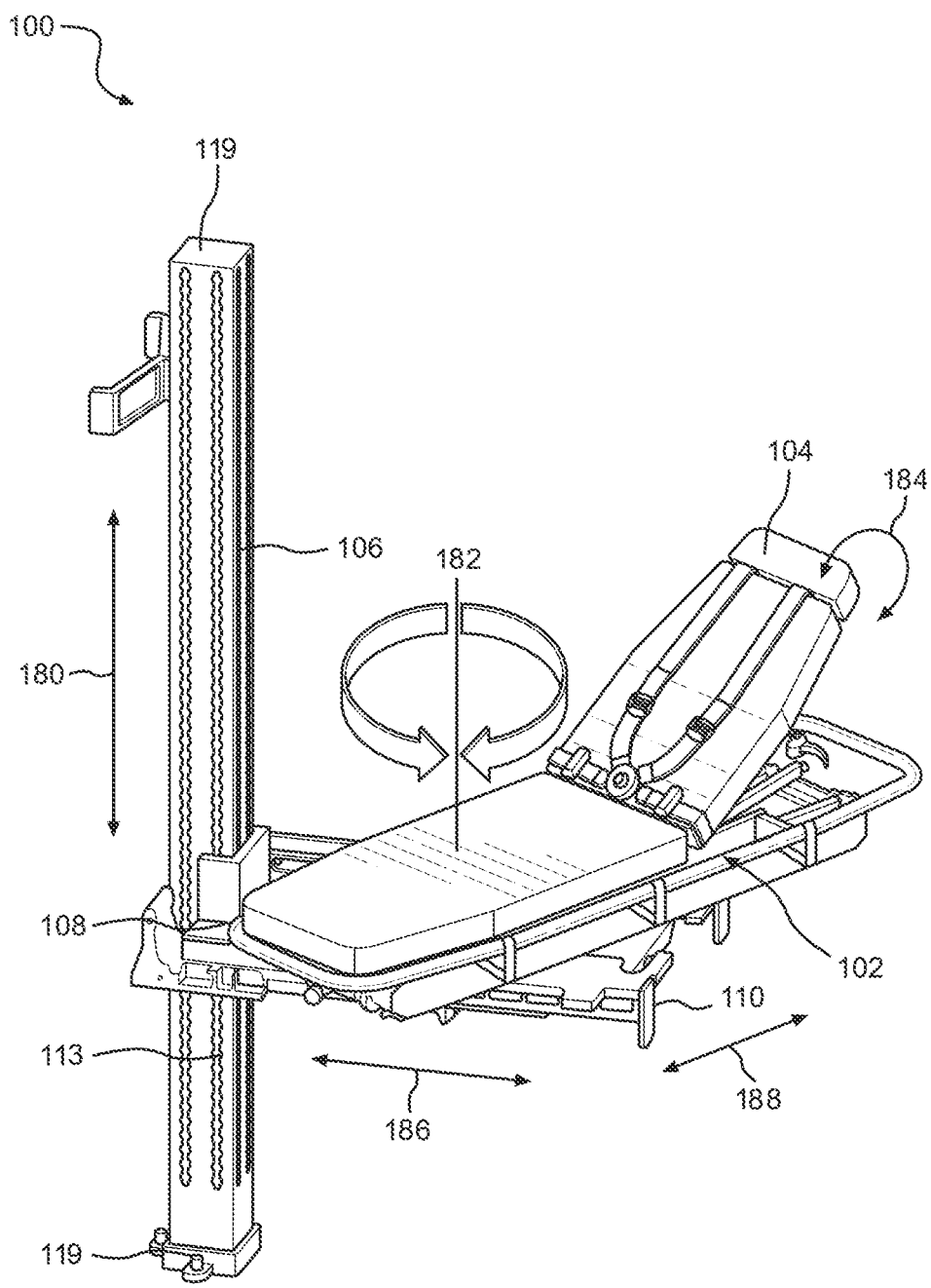
FIG. 1 is a diagram of an example litter platform support and positioning system in accordance with aspects of the present disclosure.

The disclosed litter platform support and positioning system lifts, tilts, rotates, and positions patients or other individuals both laterally and longitudinally to permit full-body access to a patient for care during transport. The disclosed litter platform support and positioning system raises and lowers a patient, liter, and deck to a desired height. In some implementations, the litter platform support and positioning system provides for quick restraining of a litter and raising or lowering one or more patients in the vehicle.

The disclosed litter platform support and positioning system may be used in various forms of transport or storage: air, ground, rail, boat directly or in various containers, pallets, or rooms in mass casualty sets requiring singular or multiple units. The disclosed litter platform support and positioning system meets stringent air and ground US FAA, DoD, DOT regulatory requirements.

In some implementations, a rolling or non-rolling litter (e.g., a wide width patient litter such as the United Rotorcaft (UR) Wide Patient Litter Model 1250 or a standard width patient litter, such as UR Standard Patient Litter Model 1080 or Model 1555) may be used to carry and restrain patients on the litter platform support and positioning system. In some implementations, a NATO litter may be used with the disclosed litter platform support and positioning system with an optional UR adapter.

The disclosed litter platform support and positioning system provides medical caregivers maximum accessibility to one or more patients in densely packed and confined spaces. Patient Loading Systems (PLS) that can assist in patient positioning and provide access are critical in the tight spaces characteristic of many medical transport vehicles. The disclosed litter platform support and positioning system accommodates patients, medical monitoring equipment and services for safe efficient Advanced Life Support (ALS) care in mass casualty care and evacuations.

As the term is used herein, a "litter" generally refers to a stretcher or basket used to transport an injured or sick individual or patient. In some implementations, a litter may be used to transport other individuals (e.g., deceased individuals). A litter may include various styles and materials. A litter may be used for incorporation onto the lift columns in the disclosed systems, as described in more detail below. In some implementations, a litter may also be referred to as a litter platform assembly. In other implementations, a litter may be incorporated into a litter platform assembly. The litter platform assembly may be placed onto a litter support assembly connected to a lift column.

As the term is used herein, "vehicle" generally refers to any vehicle, helicopter, airplane, ambulance, truck, container, trailer, room, or structure that can house the disclosed systems. By way of example, the following aircraft and ground transport are vehicles: helicopters (CH-53D/E/G/K, HH-60L/V/M, UH-60LN/M, S-70A/M/I, S-92, CH-47, Bell 525 Relentless, AW 101, NH 90, Future Vertical Lift, Future Long-Range Assault Aircraft, SB-1 Defiant, and V-280 Valor), airplanes (KC-135, KC-10 Extender, KC-46 Pegasus, KC-130, C-5 Galaxy, C-17, C-130, and V-22 Osprey), trains, trucks, vans, cars, boats, and/or anything used to transport people or goods. Vehicle may also include containers for the different types of vehicles listed above such as trailers and shipping containers.

Referring to FIG. 1, an example litter platform support and positioning system 100 in accordance with aspects of the present disclosure is shown. A litter 102 supporting a patient may be loaded onto a litter support assembly 110 on the system 100. In some implementations, the litter 102 may be a wide patient litter with loading wheels. A litter 102 may be loaded directly onto the litter support assembly 110 or the litter 102 may be attached to a litter assembly, and the litter assembly is loaded into the litter support assembly 110. The litter assembly may be a Translating Patient Loading System (TPLS). In some implementations, the litter support assembly 110 may consist of any number of arms or platforms. In some implementations, the system 100 may include one litter 102 or may be multi-tiered and include a plurality of litter support assemblies 110 arranged to support a plurality of vertically spaced litters 102.

The litter support assembly 110 is mechanically attached to a vertical column or lift column 106. The lift column 106 contains a number of features, including a carrier block 108 that attaches the litter support assembly 110 to a drive screw (shown in FIG. 3) and lift column rails 113. The lift column 106 also includes a spring curtain (not shown) that acts as a dust cover and as a protective device for operators and patients, over the moving parts internal to the lift column 106. The lift column 106 also includes end blocks 119 at both ends of the lift column 106.

In some implementations, the litter platform assembly may be powered, operated, raised and lowered either by electrical power, pneumatically, or by manual gear drive. In some implementations, a drive block (shown in FIG. 3) is located on the system 100 that includes gears and the interface to an electric drive motor along the length of the respective lift track. The electric drive motor (shown in FIG. 3) is operatively coupled to a drive screw (shown in FIG. 3) for separately and controllably rotating the drive screw to individually position each litter support assembly to independently adjust and control the position of each of said litter platforms. Specifically, the electric drive motor rotates the drive screw when activated which causes the carrier block to move, which causes the litter support assembly 110 and patient to move in a desired direction. The electric drive motor is wired to controls that provide the operator the ability to activate the system 100 and move the litter 102 in either an up or down direction depending on whether loading or unloading the patient. The controls also include safety features for the operator and integration to the vehicle electrical system.

The system 100 may also include electrical connections/interfaces, controls, and other previous engineered/manufactured details, individual mechanisms, and systems (FAA, DoD, DoT) integrated into the system 100. For example, the system 100 may be connected to a 28-volt (V) direct current (DC) battery to power the system 100. Specifically, aircraft, trucks, and boats typically include a 28-V DC battery and the system 100 may include electrical connections integrated into the system 100 that connect to the 28-V DC battery. Additionally, the system 100 may also include integrated electrical connections that connect to a 12-V DC power supply for charging cell phones and small medical equipment and a 115-V alternating current (AC) power supply. Moreover, the system 100 may also include limit switches that maintain safe space between patients and to electrically stop machinery and drives at the proper time and location. The system 100 may also utilize military AWR and FAA STC designs to minimize development, testing and qualification costs. More specifically, the system 100 may include smart devices/controllers that automatically control the system 100. For example, the system 100 may include controllers that maintain the litters 102 a predetermined distance from each other to prevent the litters 102 from colliding with each other.

The system 100 may also include electrical connections/interfaces, mechanical interfaces, racks, mounts, patient technical interfaces, data transmission devices, and other previous engineered/manufactured details, individual mechanisms, and systems (FAA, DoD, DoT) integrated to an exterior of the system 100. For example, 12 to 28 V DC electrical connections may be provided on the exterior of the system 100. The system 100 may also include various mechanical interfaces (pallets, aircraft seat tracks, hardpoints, etc.) that attached the system 100 to the vehicle. Additionally, existing qualified designs may be used to secure the system to the transport vehicle or vessel. The system 100 may also include a support structure accessory to mount various medical devices (monitors, pumps, ventilators, defibrillators, IV poles, $O_2$, power, light, etc.) and to provide electrical power to the securely mounted equipment for transport. Mounts for each of the devices may be supplied to quickly attach and secure the medical equipment to be transported with the patient. The system 100 may include mounts that securely mount various portable oxygen cylinders (e-size, d-size, jumbo d-size, and European standard EMS service cylinders) and monitors (e.g., Zoll X, Propaq MD, Propaq EL, Hamilton T1 ventilator, LTV and Revel ENVE ventilators) to the system 100. Additionally, the system 100 may include data transmission devices for encrypted wireless and or Bluetooth data transmission to ensure patient privacy.

The system 100 has a structural design to ensure that the patient, litter 102, and system 100 equipment will stay in the vehicle and are secure during high impact events, such as a crash. The structural design and integration of all the components of the system 100 are aimed to satisfy or exceed crashworthiness requirements (e.g., requirements of the FAA DoD) and the regulations that cover the vehicle incorporating the system 100. For example, the litter lift columns 106 support a majority of the force from the patient weight and system 100. The litter lift columns 106 may be machined from a high-strength aerospace aluminum (e.g., 7075-T6), which allows the system 100 components to be as light weight as possible and strong enough to support the forces imposed during a crash or other event. The aluminum surfaces may be anodized to provide a durable corrosion resistant finish.

The system 100 may have several degrees of freedom of movement (e.g., vertical, lateral, longitudinal, rotational). Specifically, the system 100 may have four degrees of freedom—vertical, lateral, longitudinal, and rotational translation to allow maximum access to the entire patient in confined spaces. The arrows 180, 182, 184, 186, and 188 depicted in FIG. 1 show directions that a litter may be moved in the system 100. The arrow 180 shows that the supports 110 can move in a vertical direction, lifting and lowering the litter 102 on the litter support assembly 110. The arrow 182 shows that the litter 102 may be rotated around on the litter support assembly 110. In some implementations, the litter 102 may rotate approximately 360°.

The arrow 184 shows that the backboard of the litter 102 is raised. In some implementations, the backboard 104 of the litter 102 may be raised or lowered. In some implementations, the backboard 104 of the litter 102 may be raised or lowered in the landing or take-off positions. In some implementations, the backboard 104 can move to elevate in a range of approximately 80°°. In some implementations, the backboard 104 moves to elevate in a range of approximately 60°. In some implementations, the backboard of the litter may not be raised or lowered.

In some implementations, the litter platform assembly may be translated along its length 12-24 inches. In some implementations, the litter platform assembly may be rotated 360 degrees. In some implementations, the litter platform assembly may be translated side to side and extended from the support post up to 30 inches.

The arrow 186 shows that the litter support assembly 110 may translate laterally (e.g., approximately 24 inches from a nominal transport position). More specifically, the litter support assembly 110 may include drawer sliders 160 that translate the litter 102 laterally in the direction of the arrow 186. The arrow 188 shows that the litter support assembly 110 may translate longitudinally (e.g., approximately 24 inches from a nominal transport position). In other implementations, the movement of the litter support assembly 110, the backboard 104, and the litter 102 may be in different degrees or distances. The litter lift assembly 110 raises and lowers the patient, litter and deck to a desired height for transport and care. In some implementations, the lift assembly attaches to the ceiling and or floor of the vehicle and provides a central support for all the remaining system components. In some implementations, the litter platform support and positioning system may have position sensors (e.g., push-button positioning, lift assist lock capability, etc.).

Figure 2:
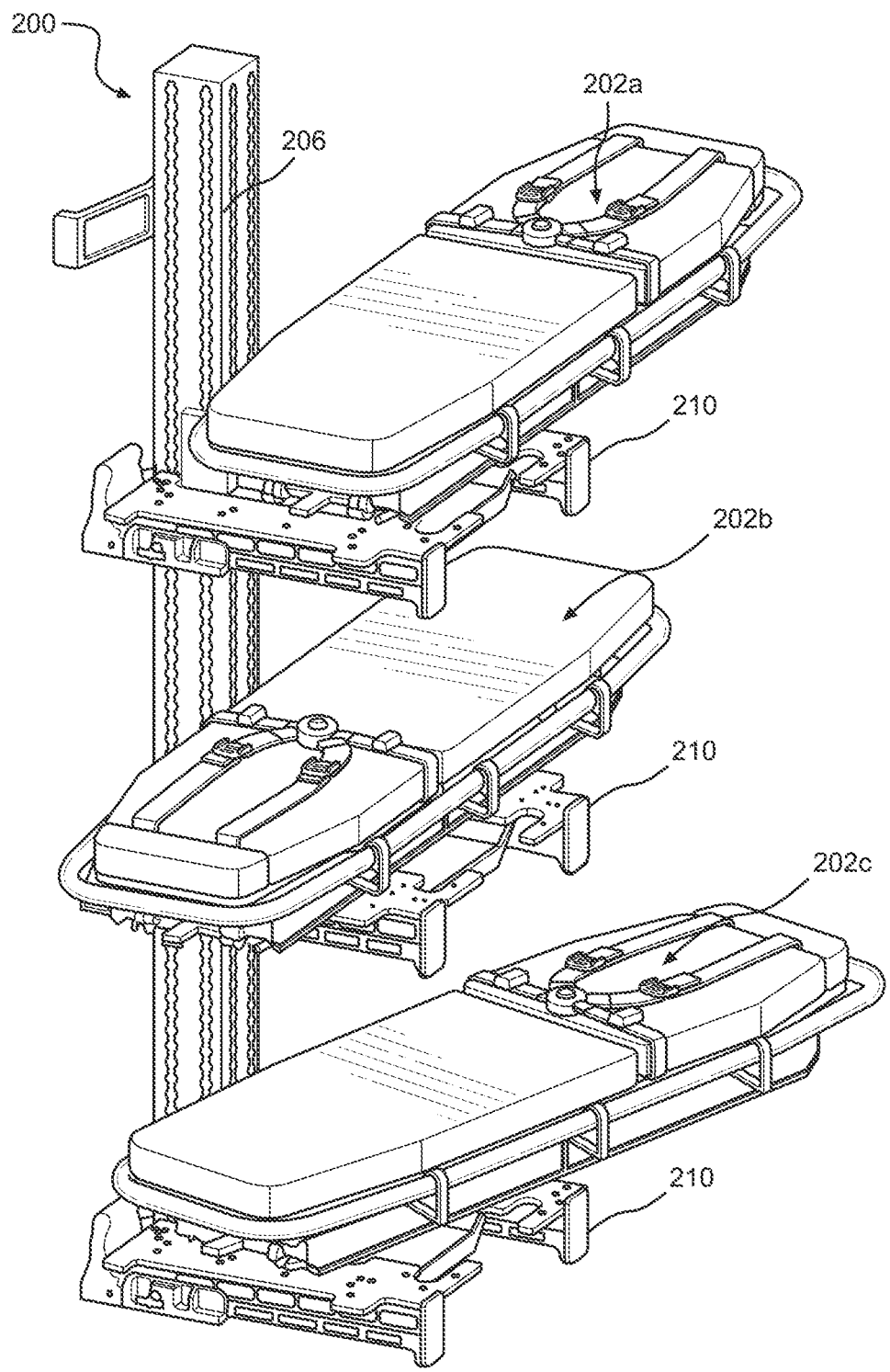
FIG. 2 is a diagram of an example litter platform support and positioning system in accordance with aspects of the present disclosure.

FIG. 2 is a diagram of an example litter platform support and positioning system 200 in accordance with aspects of the present disclosure. As shown in FIG. 2, the system 200 is multi-tiered. The system 200 has three lifters 202*a-c* on three litter support assemblies 210. In other implementations, the system 200 may have one or more litter support assemblies 210 to accommodate one or more lifters 202. The system 200 may have several degrees of freedom of movement (e.g., vertical, lateral, longitudinal, rotational). Specifically, the system 200 may have four degrees of freedom—vertical, lateral, longitudinal, and rotational translation to allow maximum access to the entire patient in confined spaces. As shown, the lifters 202*a-c* are in different positions based on the various degrees of freedom of movement.

Figure 3:
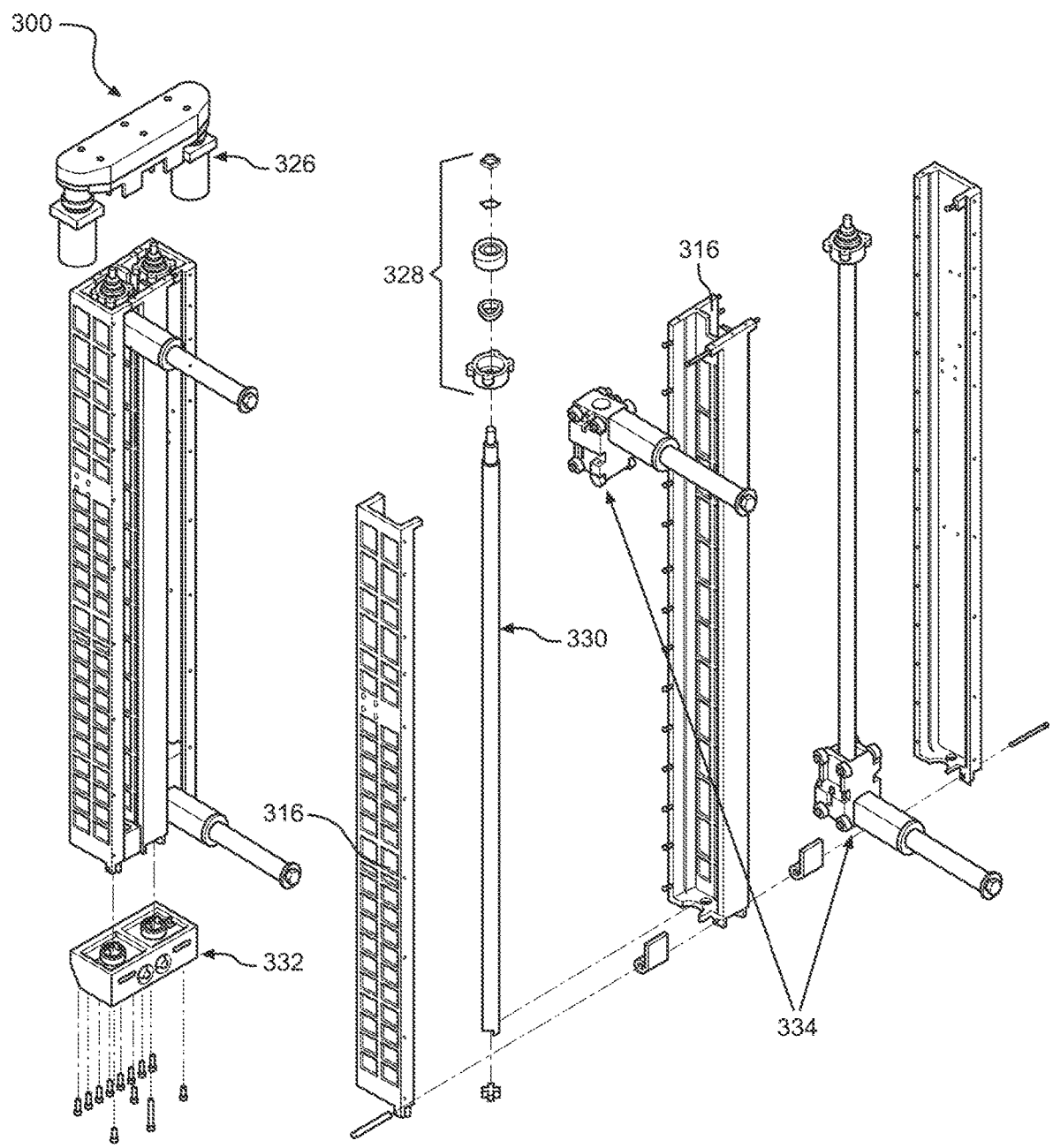
FIG. 3 is a diagram of an example litter lift assembly in accordance with aspects of the present disclosure.
Figure 4A:
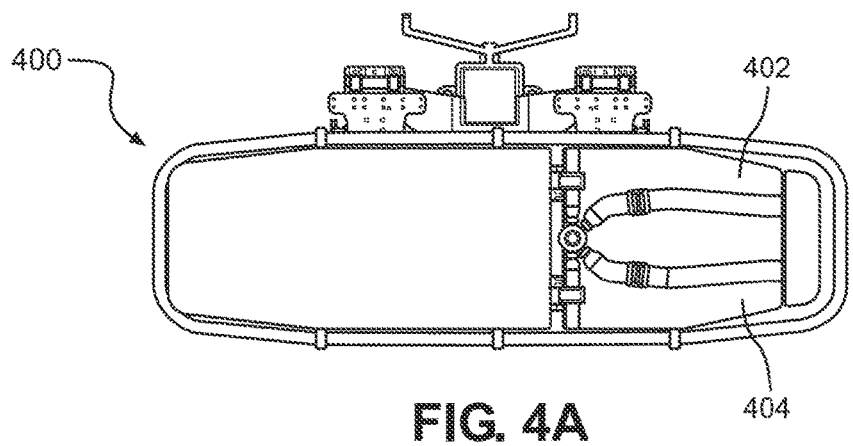
FIGS. 4A-D are diagrams of an example litter platform support and positioning system in the disclosed technology in accordance with aspects of the present disclosure.
Figure 4B:
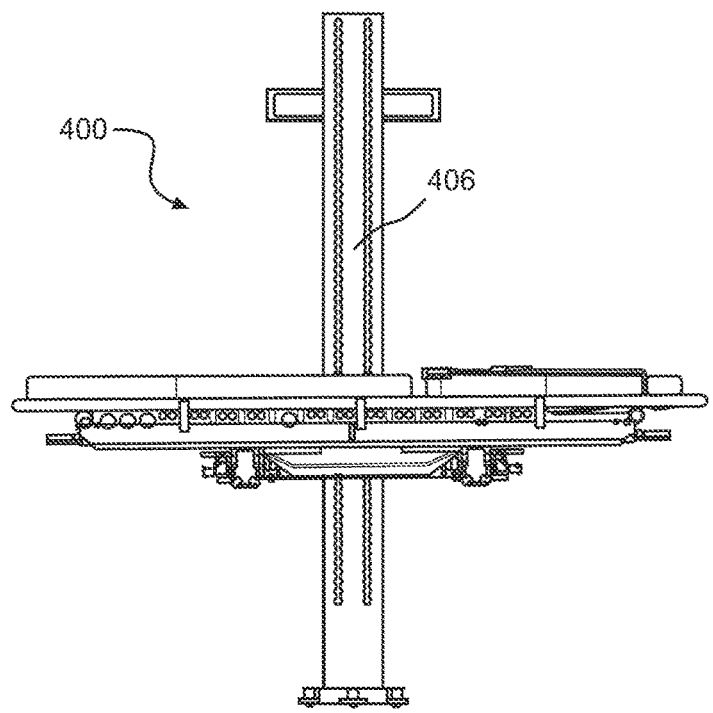
Figure 4C:
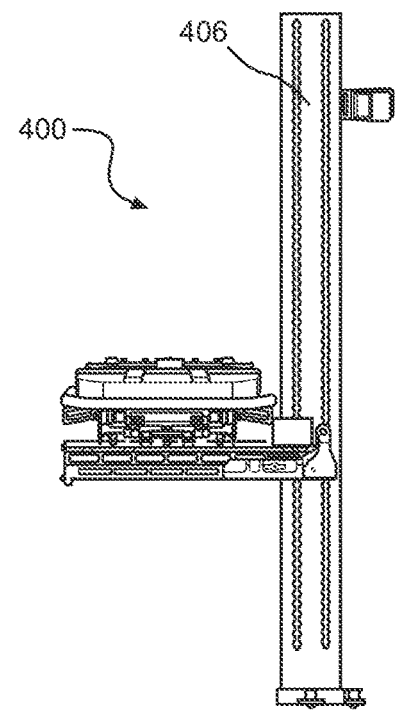
Figure 4D:
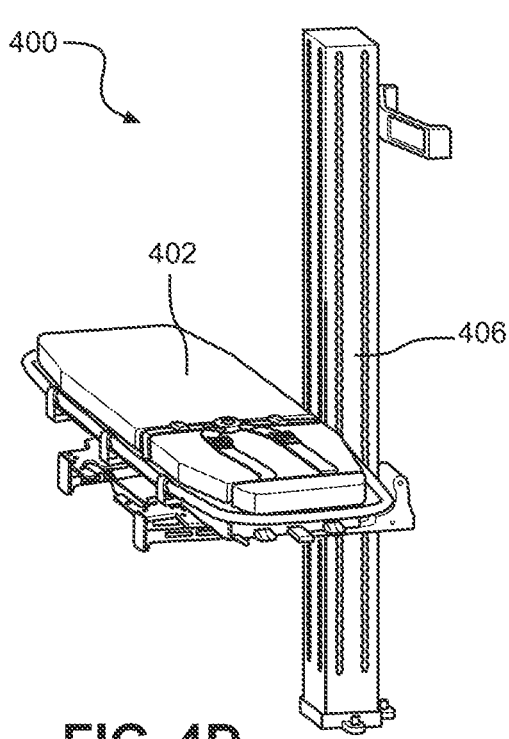

FIG. 3 is a diagram of an example litter lift assembly 300 in accordance with aspects of the present disclosure. The litter lift assembly 300 is positioned within the systems 100 and 200 to raise and lower the lifters 102 and 202. As shown in FIG. 3, the liter lift assembly 300 includes a belt drive module 332, a bearings and mounting block 328, a hollow stainless-steel screw 330, a manual drive module 326, and a carriage block/lift arm assembly 334. The liter lift assembly 300 also includes a column cover 316 that houses the bearings and mounting block 328, the hollow stainless-steel screw 330, and the carriage block/lift arm assembly 334. The belt drive module 332 is rotatably attached to the hollow stainless-steel screw 330. The hollow stainless-steel screw 330 extends through the column cover 316 and are rotatably attached to the carriage block/lift arm assembly 334. The carriage block/lift arm assembly 334 is attached to the carousel (not shown) to enable the litter platform (not shown), and a patient on the litter platform (not shown), to be raised or lowered as needed.

During operations, the belt drive module 332 rotates the hollow stainless-steel screw 330 and the hollow stainless-steel screw 330 raises or lowers the carriage block/lift arm assembly 334. The carriage block/lift arm assembly 334 is attached to the carousel (not shown) and the litter platform (not shown) and raises and lowers the carousel (not shown) and the litter platform (not shown).

FIGS. 4A-D are diagrams of an example litter platform support and positioning system 400 in the disclosed technology in accordance with aspects of the present disclosure. Specifically, the system 400 may have four degrees of freedom—vertical, lateral, longitudinal, and rotational translation to allow maximum access to the entire patient in confined spaces. More specifically, a backboard 404 of a litter 402 in the system 400 may be raised or lowered during landing or take-off to allow maximum access to the entire patient in confined spaces. As shown in FIGS. 4A-D, the backboard 404 is shown lowered.

Figure 5A:
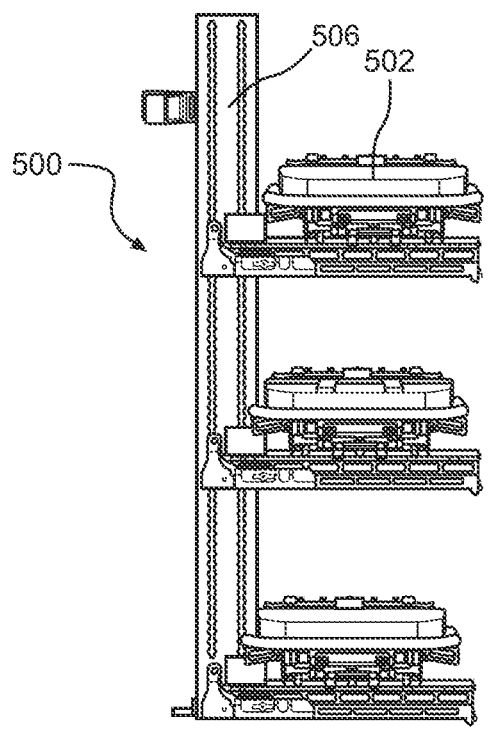
FIGS. 5A-B are diagrams of an example litter platform support and positioning system in the disclosed technology in accordance with aspects of the present disclosure.
Figure 5B:
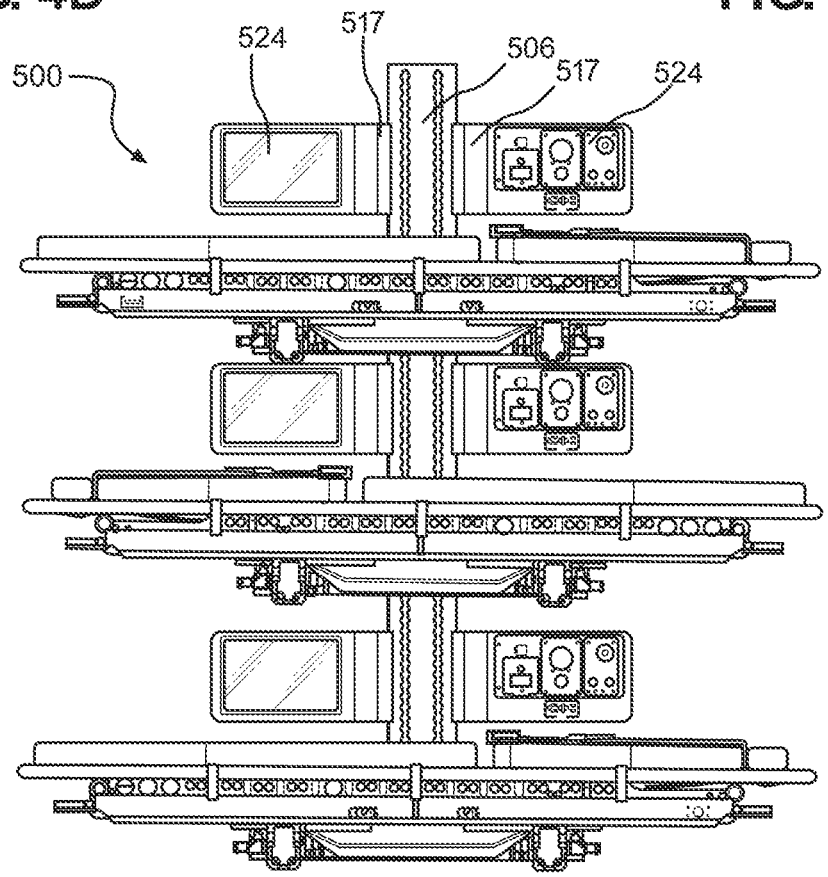

FIG. 5A-B are diagrams of an example litter platform support and positioning system 500 in the disclosed technology in accordance with aspects of the present disclosure. The system 500 shows a three-patient ALS module in FIG. 5A with three litters 502 and with medical equipment and accessory mounting options in FIG. 5B. For example, as shown in FIGS. 5A and B, the system 500 includes at least one mount 517 for mounting monitoring equipment 524. In the illustrated embodiment, each litter lift columns 506 includes six mounts 517, two for each litter 502. Specifically, two mounts 517 are mounted above each litter 502, and monitoring equipment 524 is mounted or attached to each mount 517. Thus, the mounts 517 enable patient data to be displayed proximate each patient above each litter 502.

Figure 6:
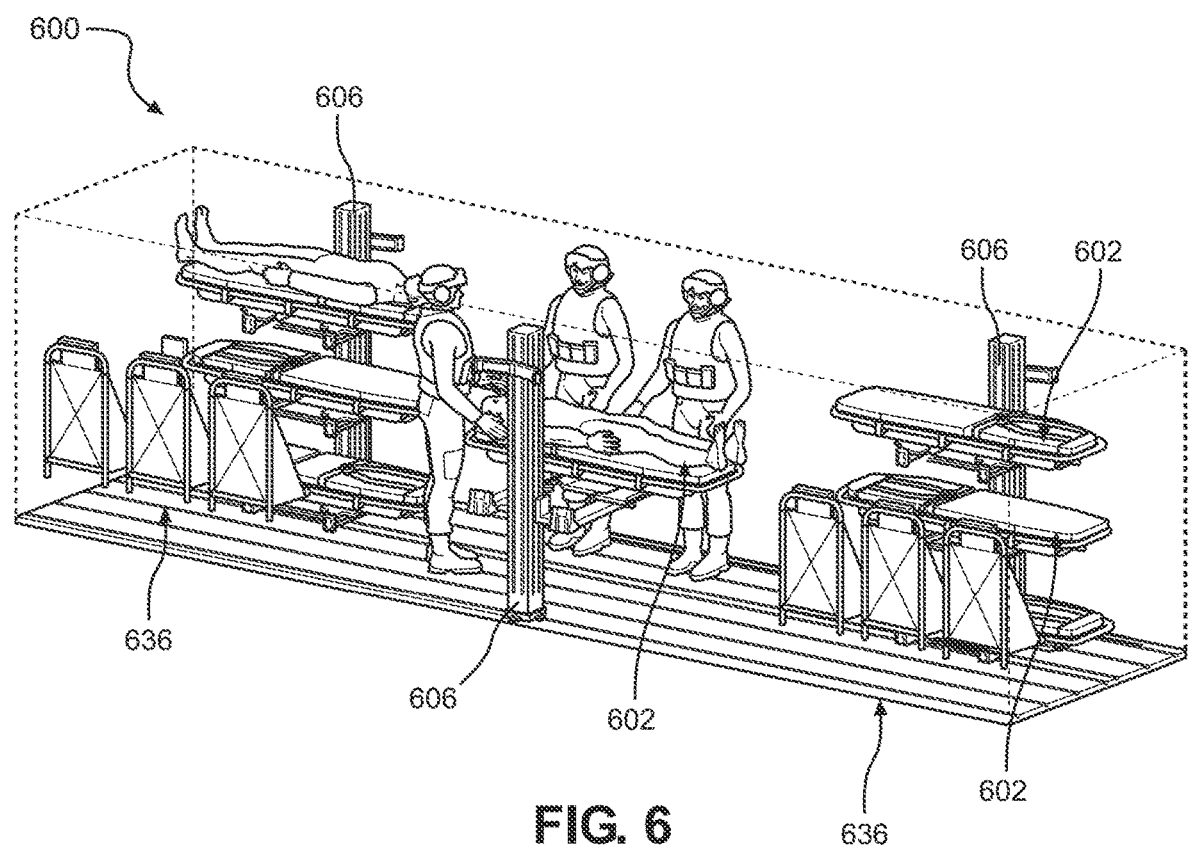
FIG. 6 is a diagram of an example litter platform support and positioning system in accordance with aspects of the present disclosure.

FIG. 6 is a diagram of an example litter platform support and positioning system 600 in accordance with aspects of the present disclosure. The system 600 may be incorporated into a variety of environments. For example, the system 600 may be incorporated into a vehicle, a room in a building, or a movable storage container. FIG. 6 illustrates a system 600 that may be implemented in any of these examples. In some implementations, there may be multiple lift columns 606, each lift column 606 supporting one or more litters 602. In FIG. 6, there are three lift columns 606, with one or and three litters 602 shown on the lift columns 606. In some implementations, the system 600 may include ambulatory seating 636 for health professionals, patients, or other individuals. In some implementations, the ambulatory seating 636 may be stowable. The system 600 may be scalable and used in various scenarios (e.g., triage, critical care, ICE, non-critical, surgical, etc.). The system 600 may also be used in trucks, boats, airplanes, helicopters, storage containers, and other Future Vertical Lifts.

Figure 7:
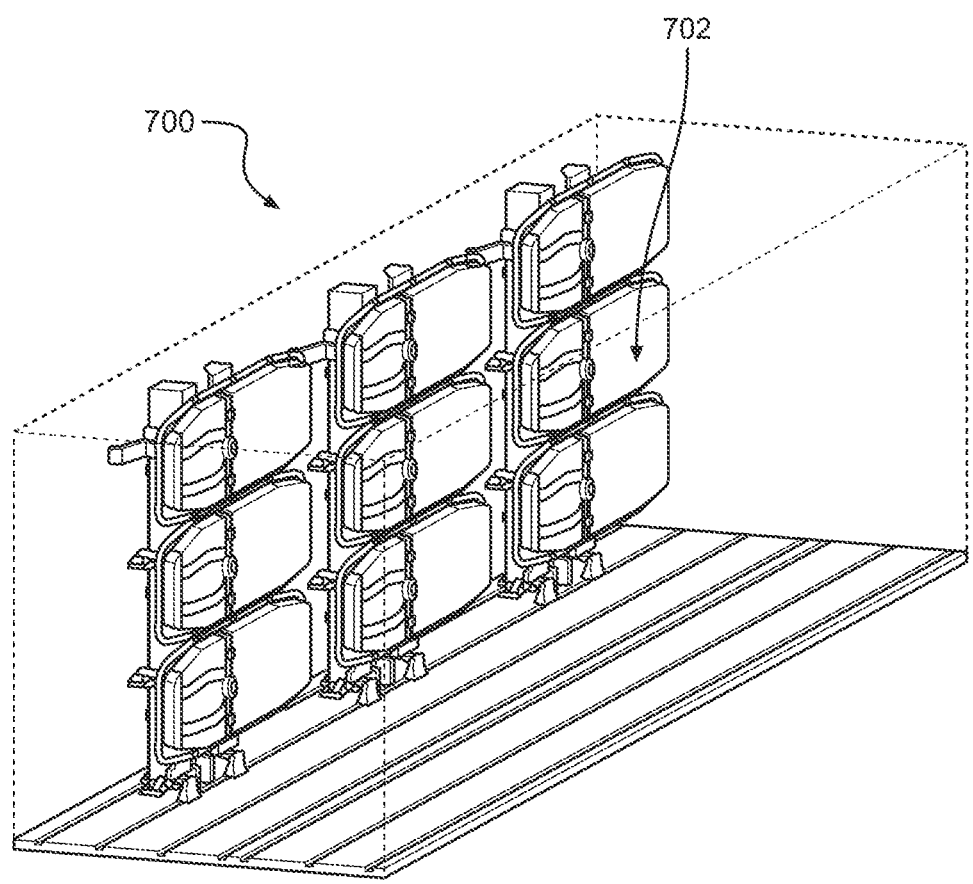
FIG. 7 is a diagram of an example litter platform support and positioning system in accordance with aspects of the present disclosure.
Figure 8A:
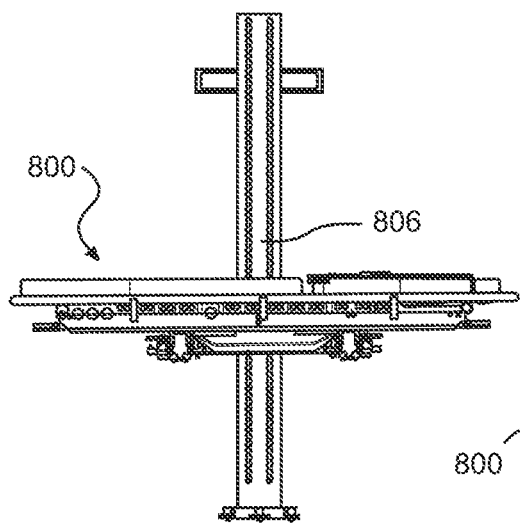
FIGS. 8A-E are diagrams illustrating lateral extension of a litter in an example litter platform support and positioning system in accordance with aspects of the present disclosure.
Figure 8B:
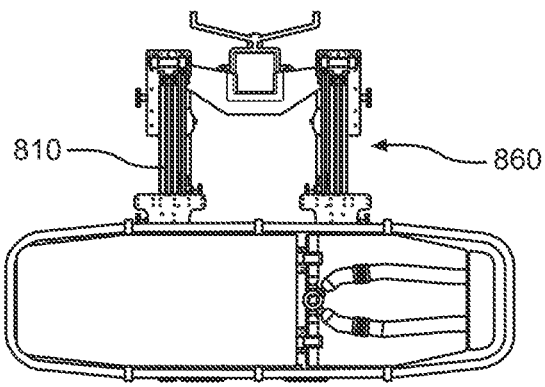
Figure 8C:
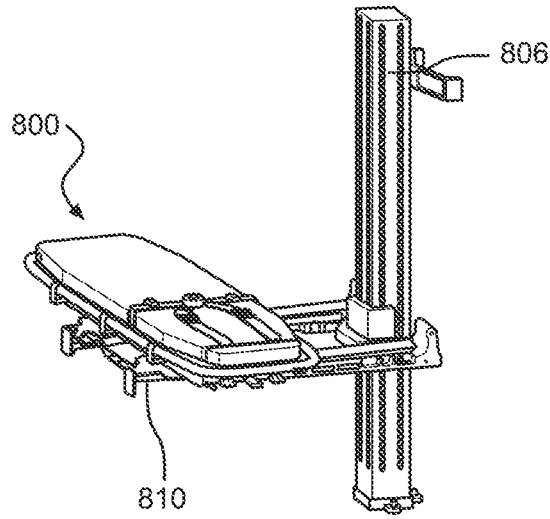
Figure 8D:
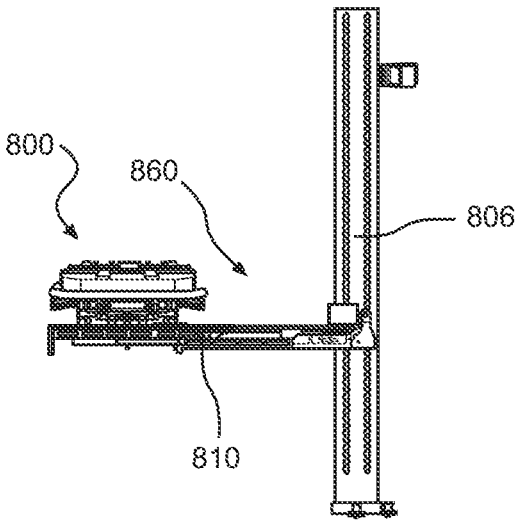
Figure 8E:
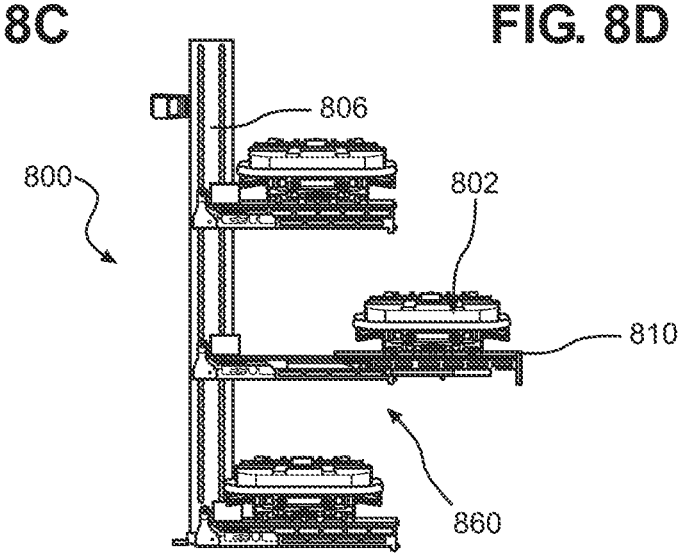
Figure 9A:
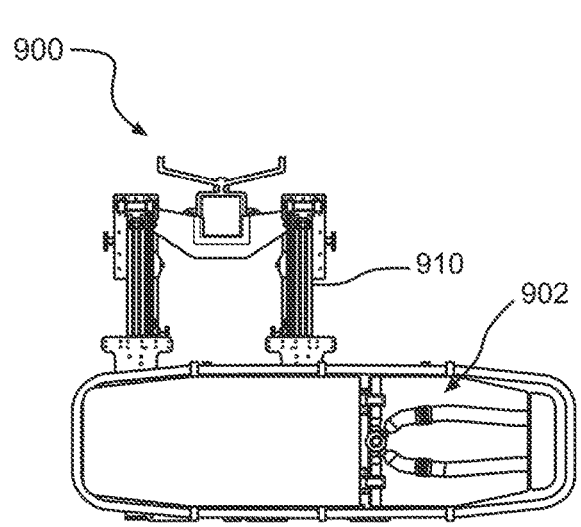
FIGS. 9A-D are diagrams illustrating lateral and longitudinal extension of a litter in an example litter platform support and positioning system in accordance with aspects of the present disclosure.
Figure 9B:
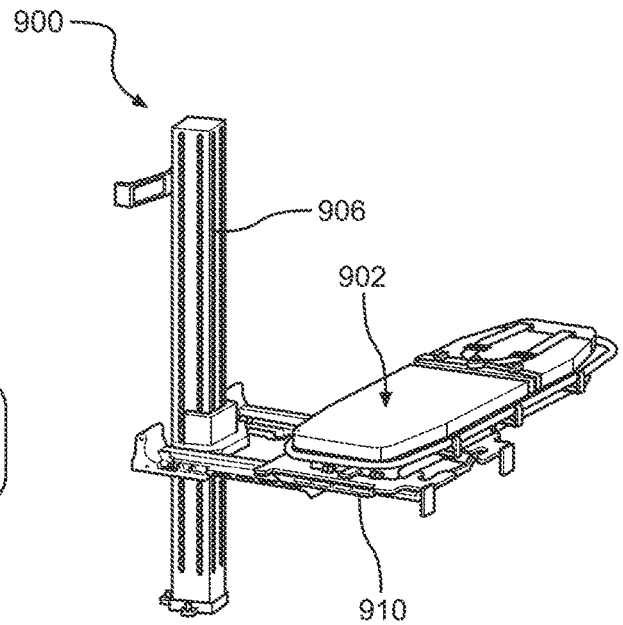
Figure 9C:
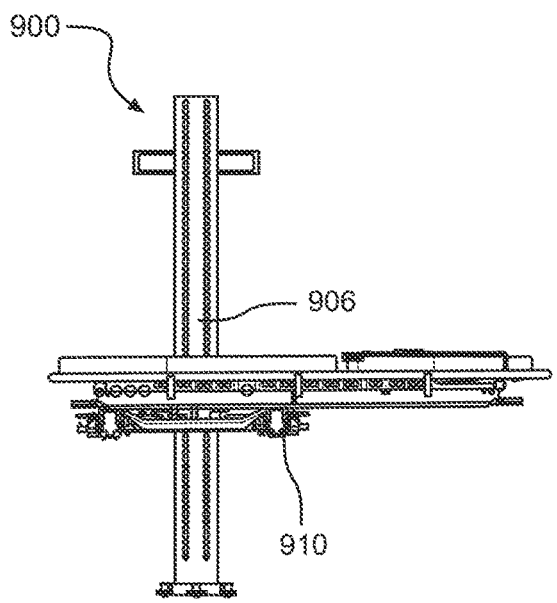
Figure 9D:
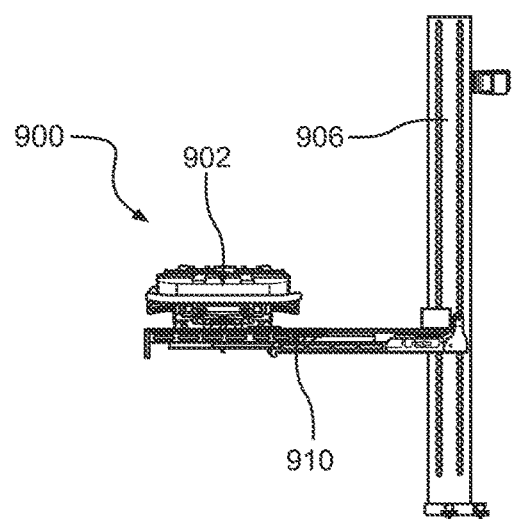
Figure 10A:
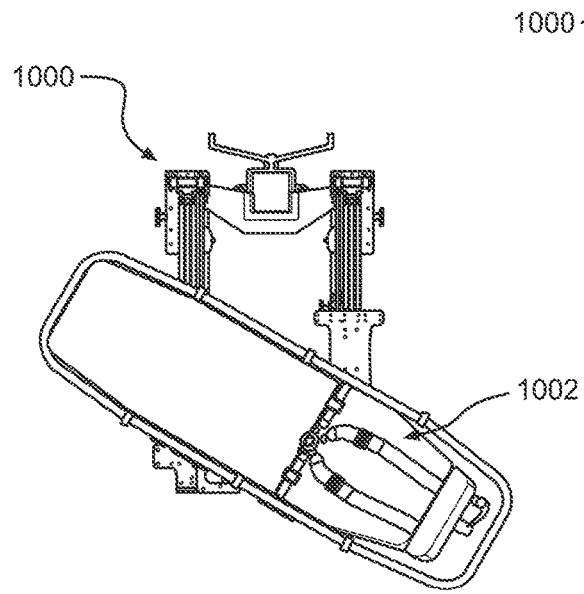
FIGS. 10A-D are diagrams illustrating rotation and tilt of a litter in an example litter platform support and positioning system during storage in accordance with aspects of the present disclosure.
Figure 10B:
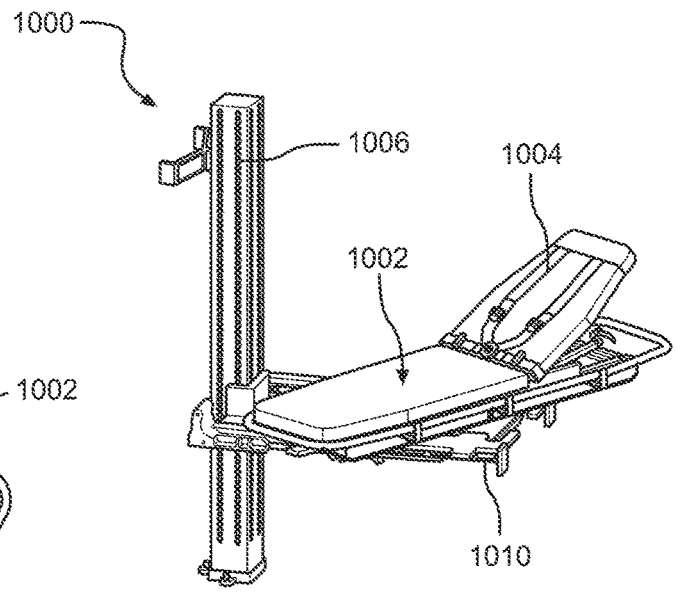
Figure 10C:
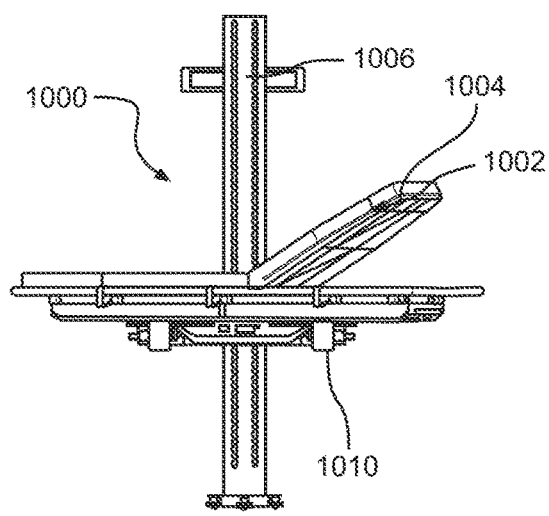
Figure 10D:
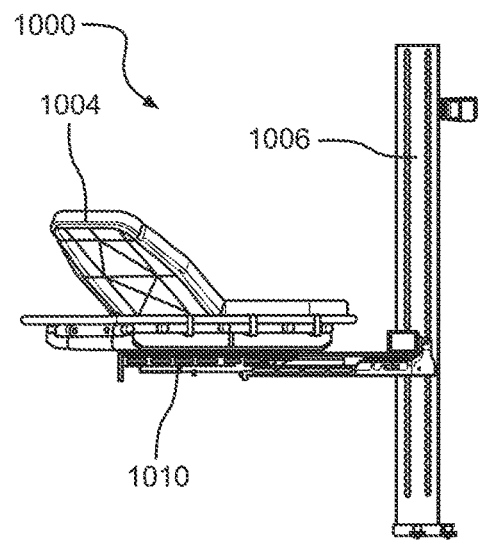

FIG. 7 is a diagram of an example litter platform support and positioning system 700 during storage in accordance with aspects of the present disclosure. As shown, the litters 702 are shown in a stored position. The system 700 may be incorporated into a variety of environments. For example, the system 700 may be incorporated into a vehicle, a room in a building, or a movable storage container. FIG. 7 illustrates a system 700 that may be implemented in any of these examples.

FIGS. 8A-E are diagrams illustrating multiple views of lateral extension in an example litter platform support and positioning system 800 in accordance with aspects of the present disclosure. Specifically, the system 800 may have four degrees of freedom—vertical, lateral, longitudinal, and rotational translation to allow maximum access to the entire patient in confined spaces. As shown in FIGS. 8A-E, the litter support assemblies 810 include arms including drawer sliders 860 that translate litters 802 laterally to allow maximum access to the entire patient in confined spaces. The litter support assemblies 810 are shown moved from a lift column 806 in lateral extension, allowing for the litter 802 to be moved laterally away from the lift column 806.

FIGS. 9A-D are diagrams illustrating multiple views of lateral and longitudinal extension of a litter 902 in an example litter platform support and positioning system 900 in accordance with aspects of the present disclosure. Specifically, the system 900 may have four degrees of freedom—vertical, lateral, longitudinal, and rotational translation to allow maximum access to the entire patient in confined spaces. As shown in FIGS. 9A-D, the system 900 includes litter support assemblies 910 including arms including drawer sliders 960 that translate litters 902 laterally to allow maximum access to the entire patient in confined spaces. Additionally, the litters 902 are slidably attached to the litter support assemblies 910 such that the litters 902 are translated longitudinally.

FIGS. 10A-D are diagrams illustrating rotation and tilt of a litter in an example litter platform support and positioning system 1000 including a lift column 1006 in accordance with aspects of the present disclosure. Specifically, the system 1000 may have four degrees of freedom—vertical, lateral, longitudinal, and rotational translation to allow maximum access to the entire patient in confined spaces. As shown, a portion of a backboard 1004 of a litter 1002 attached to a litter support assembly 1010 may be tilted and the torso of patient may be elevated (e.g., up to 80 degrees) during all aspects of transport to allow maximum access to the entire patient in confined spaces.

As shown in FIGS. 1-10, systems 100-1000 may have four degrees of freedom—vertical, lateral, longitudinal, and rotational translation to allow maximum access to the entire patient in confined spaces. Additionally, the systems 100-1000 may include smart devices/controllers that automatically control the systems 100-1000. For example, the systems 100-1000 may include controllers that maintain the litters 102-1002 a predetermined distance from each other to prevent the litters 102-1002 from colliding with each other.

Figure 11:
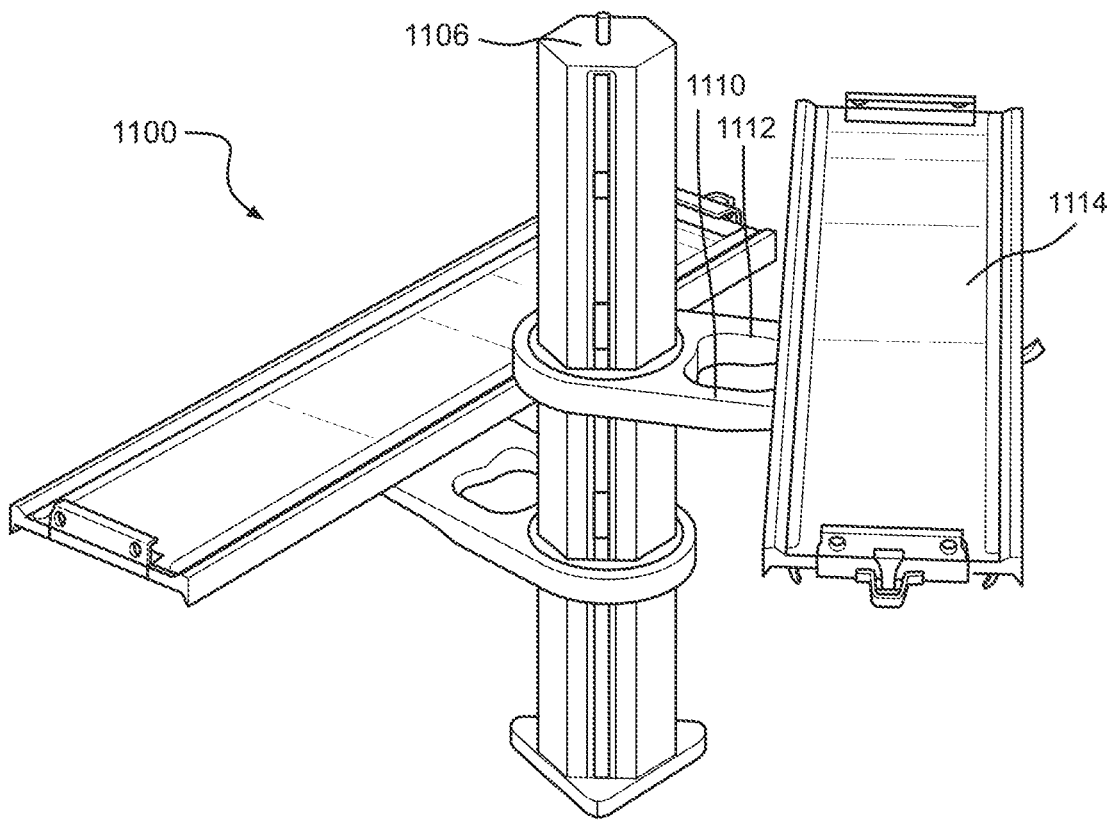
FIG. 11 is a diagram of an example litter platform support and positioning system in accordance with aspects of the present disclosure.

Referring to FIG. 11, an alternative embodiment of a litter platform support and positioning system 1100 in accordance with aspects of the present disclosure is shown. A litter (not shown) supporting a patient may be loaded onto at least one litter support assembly 1110 on the system 1100. In some implementations, the litter may be a wide patient litter with loading wheels. The litter may be loaded directly onto the litter support assembly 1110 or the litter may be attached to a litter assembly, and the litter assembly may be loaded onto the litter support assembly 1110. The litter assembly may be a Translating Patient Loading System (TPLS).

The litter platform support and positioning system 1100 includes a lift column 1106 and at least one litter support assembly 1110 attached to the lift column 1106. In the illustrated embodiment, the system 1100 includes two litter support assemblies 1110 attached to the lift column 1106. In alternative embodiments, the system 1100 may include any number of litter support assemblies 1110 that enable the system 1100 to operate as described herein. Each litter support assembly 1110 includes a carousel 1112 and a litter platform 1114. The carousel 1112 movably attaches the litter platform 1114 to the lift column 1106 to enable the litter platform 1114, and a patient on the litter platform 1114, to be raised or lowered as needed. More specifically, as described herein, the lift column 1106 includes internal components that enable the lift column 1106 to selectively raise and lower the litter support assemblies 1110.

Figure 12:
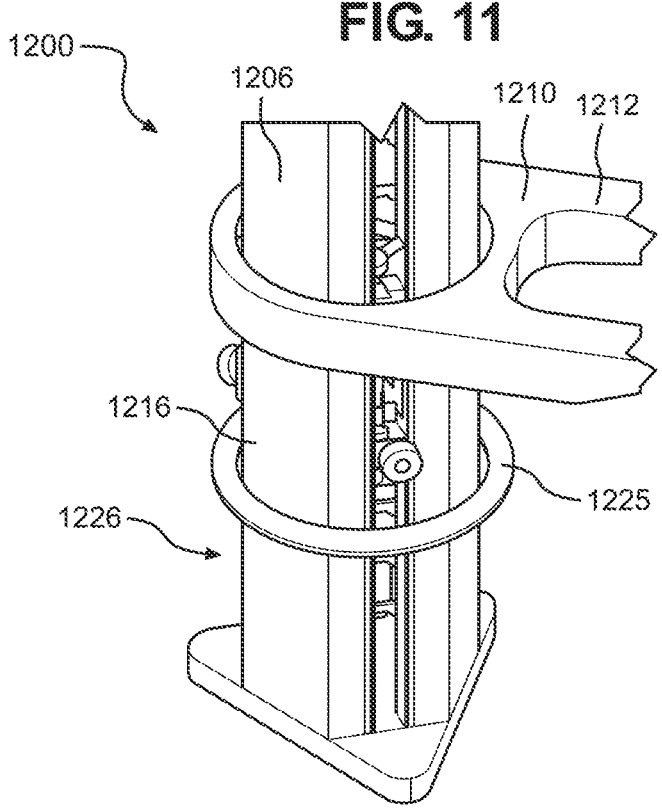
FIG. 12 is a diagram of a portion of an example litter platform support and positioning system in accordance with aspects of the present disclosure.

FIG. 12 is a diagram of a portion of an example litter platform support and positioning system 1200 in accordance with aspects of the present disclosure. The system 1200 includes a lift column 1206 that includes a column cover 1216 and a carousel bottom plate 1225. The carousel bottom plate 1225 circumscribes a bottom portion 1226 of the column cover 1216 and prevents a litter support assembly 1210 from moving beyond a predetermined position.

Figure 13:
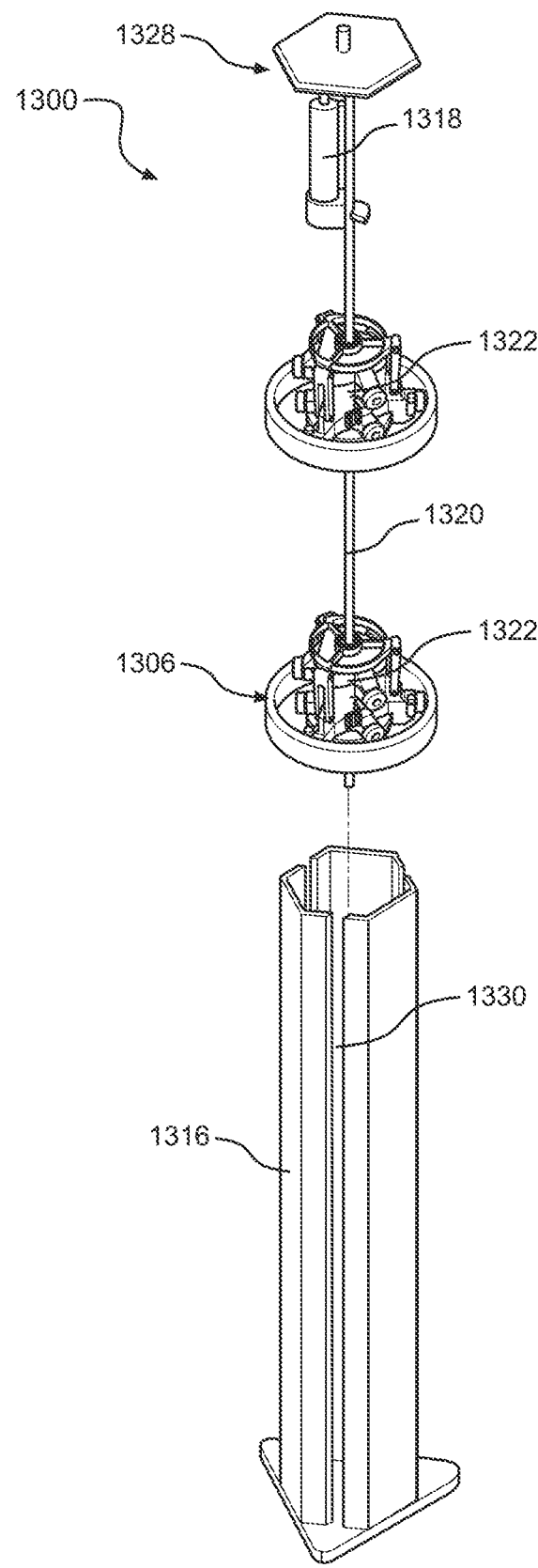
FIG. 13 is a diagram of a portion of an example litter platform support and positioning system in accordance with aspects of the present disclosure.

FIG. 13 is a diagram of a portion of an example litter platform support and positioning system 1300 in accordance with aspects of the present disclosure. The system 1300 includes a lift column 1306 that includes a column cover 1316, a motor 1318, a ball screw 1320, and at least one carriage system 1322. The column cover 1316 houses the motor 1318, the ball screw 1320, and the at least one carriage system 1322. The motor 1318 is housed in an upper portion 1328 of the column cover 1316 and is rotatably attached to the ball screw 1320. The ball screw 1320 extends through the column cover 1316 and is rotatably attached to the at least one carriage system 1322. The at least one carriage system 1322 is attached to the carousel (not shown) to enable the litter platform (not shown), and a patient on the litter platform (not shown), to be raised or lowered as needed.

During operations, the motor 1318 rotates the ball screw 1320 and the ball screw 1320 raises or lowers the at least one carriage system 1322. The at least one carriage system 1322 is attached to the carousel (not shown) and the litter platform (not shown) and raises and lowers the carousel (not shown) and the litter platform (not shown). Specifically, as described herein, the ball screw 1320 selectively interacts with the at least one carriage system 1322 to raise and lower the at least one carriage system 1322, the carousel (not shown), and the litter platform (not shown).

As shown in FIG. 13, the system 1300 includes a single motor 1318, a single ball screw 1320, and a plurality of carriage systems 1322 that connect to a plurality of litter support assemblies (not shown). Specifically, the design of the carriage systems 1322 enables the system 1300 to raise and lower multiple litter support assemblies 1310 using a single motor 1318 and a single ball screw 1320, reducing the weight of the system 1300 and reducing the weight of the vehicle. Accordingly, the system 1300 enables a vehicle to transport multiple patients while reducing the weight of the system 1300.

Figure 14:
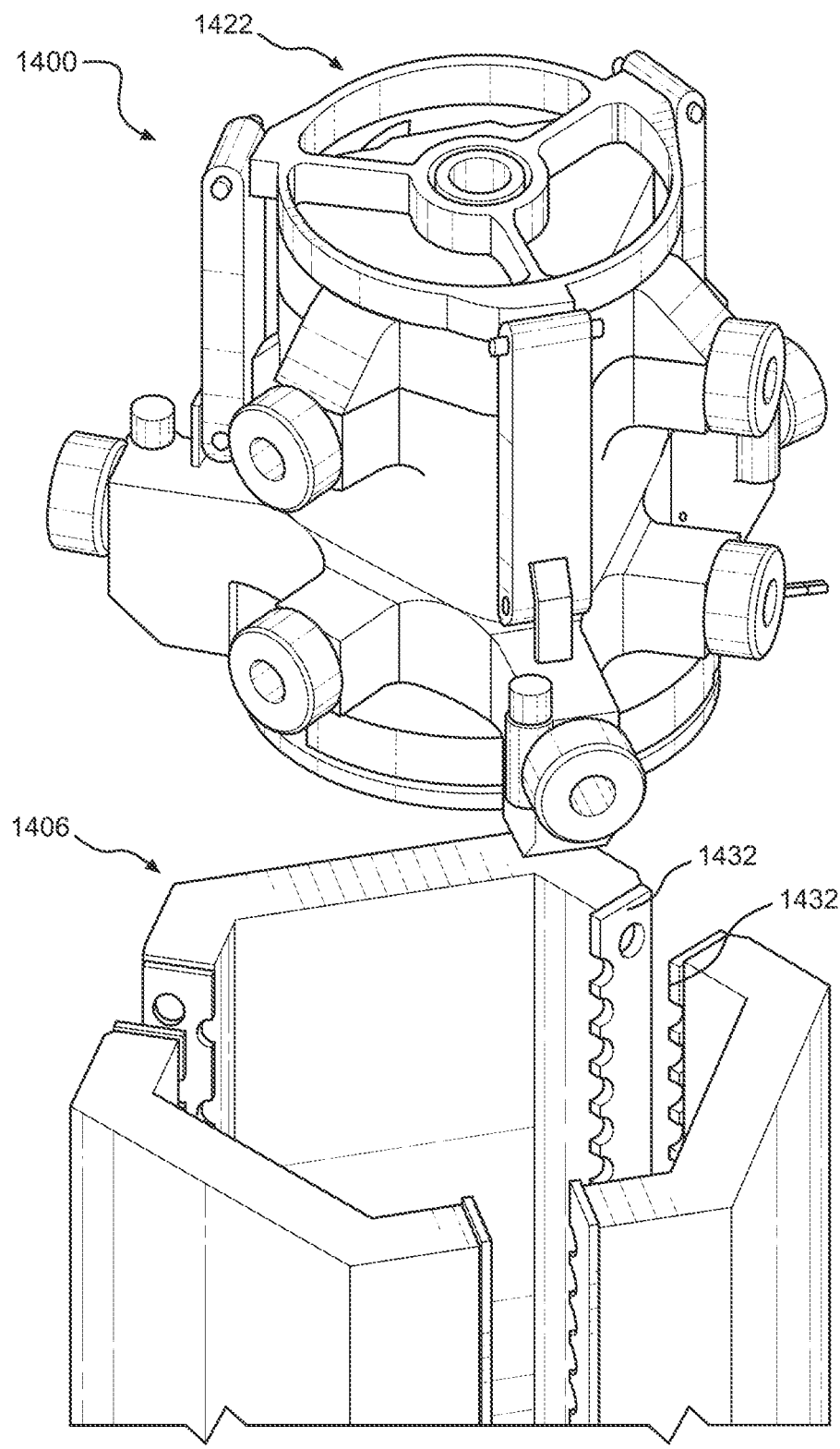
FIG. 14 is a diagram of a portion of an example litter platform support and positioning system in accordance with aspects of the present disclosure.

FIG. 14 is a diagram of a portion of an example litter platform support and positioning system 1400 in accordance with aspects of the present disclosure. A column cover 1416 defines a plurality of tracks 1430, and ratchet tracks 1432 positioned on either side of the tracks 1430. The tracks 1430 and the ratchet tracks 1432 guide the at least one carriage system 1422 vertically within the column cover 1416 when the ball screw 1420 rotates and the at least one carriage system 1422 interacts with the ball screw 1420.

Figure 15:
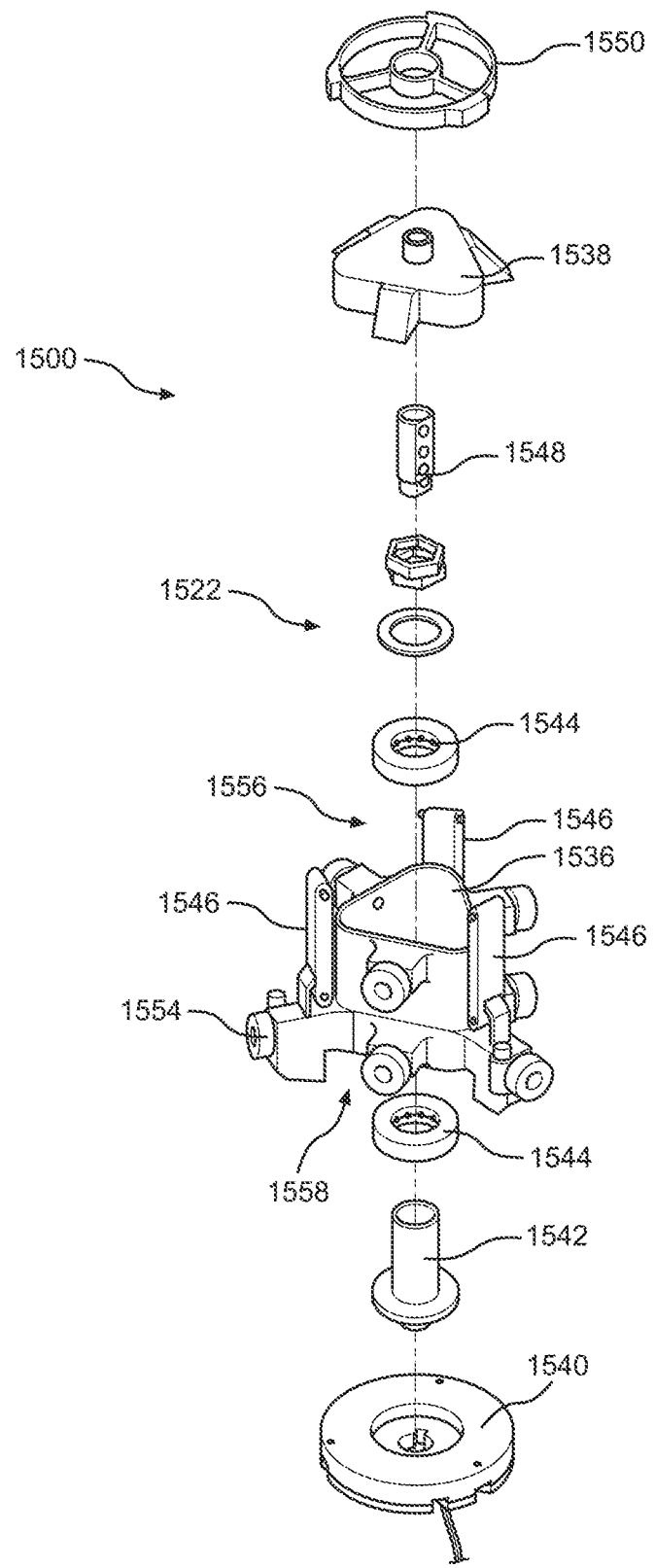
FIG. 15 is a diagram of a portion of an example litter platform support and positioning system in accordance with aspects of the present disclosure.

FIG. 15 is a diagram of a portion of an example litter platform support and positioning system 1500 in accordance with aspects of the present disclosure. At least one carriage system 1522 includes a housing 1536, a top plate 1538, an electric brake 1540, a torque transfer shaft 1542, thrust bearings 1544, a plurality of lock arms 1546, a ball nut 1548, a lock actuator 1550, and an electrical pick up unit 1552. The housing 1536 includes attachments 1554 that attach the least one carriage system 1522 to the carousel (not shown), and the housing 1536 houses the ball nut 1548, the thrust bearings 1544, and the torque transfer shaft 1542. The top plate 1538 is attached to a top 1556 of the housing 1536 and the electric brake 1540 is attached to a bottom 1558 to the housing 1536. The lock actuator 1550 is attached to the top plate 1538 and the lock arms 1546 are attached to the housing 1536.

The ball screw (not shown) and the ball nut 1548 raise and lower the at least one carriage system 1522 within the column cover (not shown). Specifically, the at least one carriage system 1522 engages the ball nut 1548 such that rotation of the ball screw (not shown) raises and lowers the at least one carriage system 1522. More specifically, the ball screw (not shown) and the ball nut 1548 are a mechanical linear actuator that translates rotational motion of the ball screw (not shown) to linear motion of the ball nut 1548 and the at least one carriage system 1522. The ball screw (not shown) is a threaded shaft that includes a helical raceway that rotates as the motor 1518 rotates the ball screw (not shown). The ball nut 1548 includes a plurality of ball bearings that selectively interface with the helical raceway of the threaded shaft of the ball screw (not shown) to raise and lower the at least one carriage system 1522. The ball nut 1548 is electrically engaged and disengaged such that the at least one carriage system 1522 is selectively raised and lowered. As such, the ball screw (not shown) and the ball nut 1548 enable the litter support assemblies 1510 to be individually raised and lowered.

Figure 16:
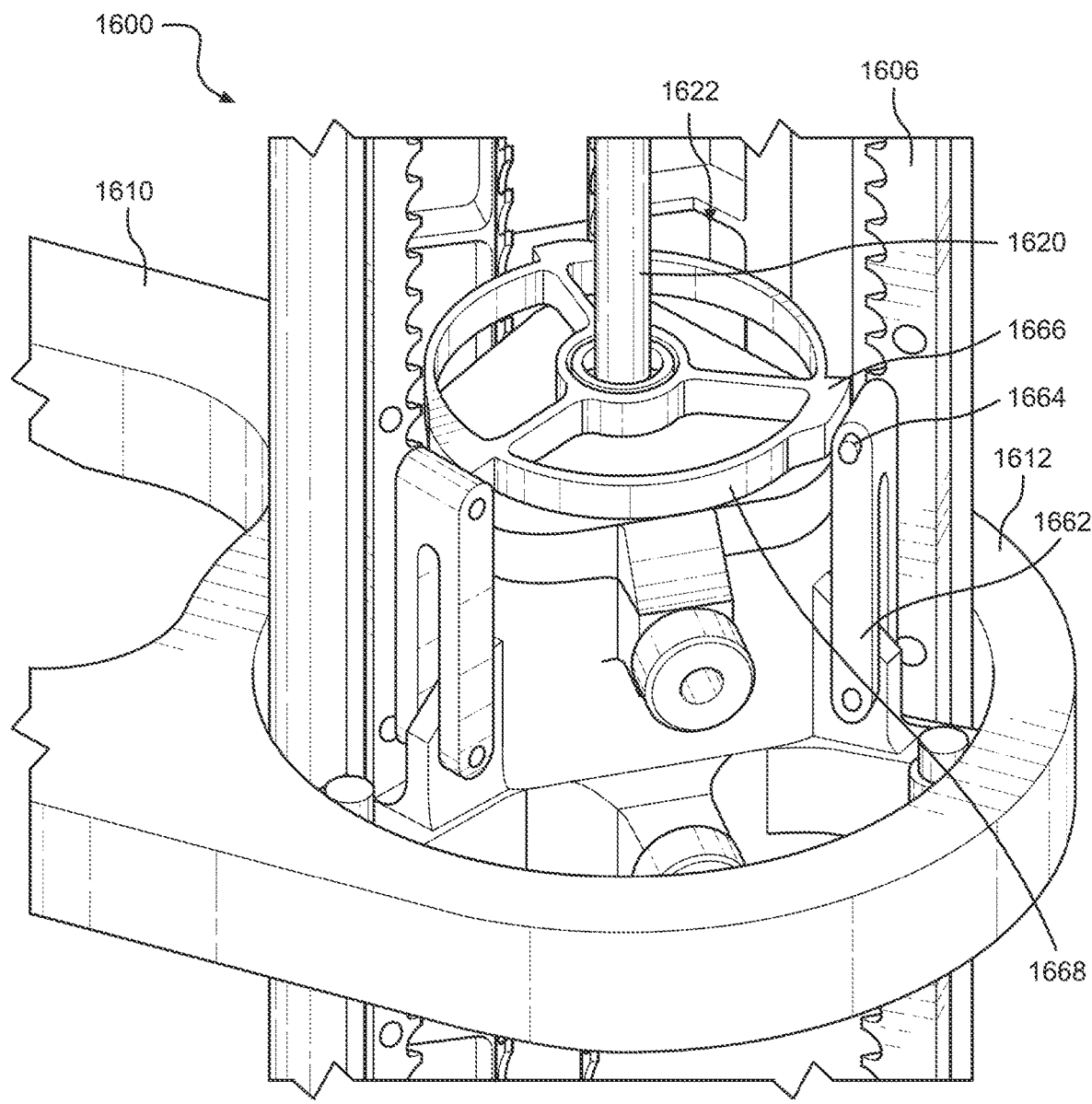
FIG. 16 is a diagram of a portion of an example litter platform support and positioning system in accordance with aspects of the present disclosure.

FIG. 16 is a diagram of a portion of an example litter platform support and positioning system 1600 in accordance with aspects of the present disclosure. As shown in FIG. 16, a lock actuator 1650, lock arms 1646, and ratchet tracks 1632 enable at least one carriage system 1622 to remain in position when a ball nut 1648 is disengaged from a ball screw 1620. Specifically, the lock actuator 1650, the lock arms 1646, and the ratchet tracks 1632 define a ratchet mechanism, or a mechanism that enables linear motion in a first direction while preventing linear motion in a second direction, that maintains the position of the at least one carriage system 1622 within the column cover 1616 when the ball nut 1648 is disengaged from the ball screw 1620. The lock arms 1646 each include a body 1662 and a plurality of pins 1664 extending from the body 1662. Additionally, the body 1662 is rotatably attached to the housing 1636 such that the pins 1664 extend into the ratchet tracks 1632 when the body 1662 is rotated outward from the housing 1636. The body 1662 is biased toward the housing 1636, and the lock actuator 1650 rotates the body 1662 toward the ratchet tracks 1632. More specifically, the lock actuator 1650 has a circular shape with prongs 1666 extending from a circular body 1668. When the lock actuator 1650 is rotated, the prongs 1666 interface with the body 1662 of the lock arms 1646, rotating the lock arms 1646 and the pins 1664 away from the housing 1636 and into the ratchet tracks 1632. The ratchet tracks 1632 include a plurality of teeth 1670 that interface with the pins 1664 to maintain the at least one carriage system 1622 in position when the ball nut 1648 is disengaged from the ball screw 1620.

Figure 17:
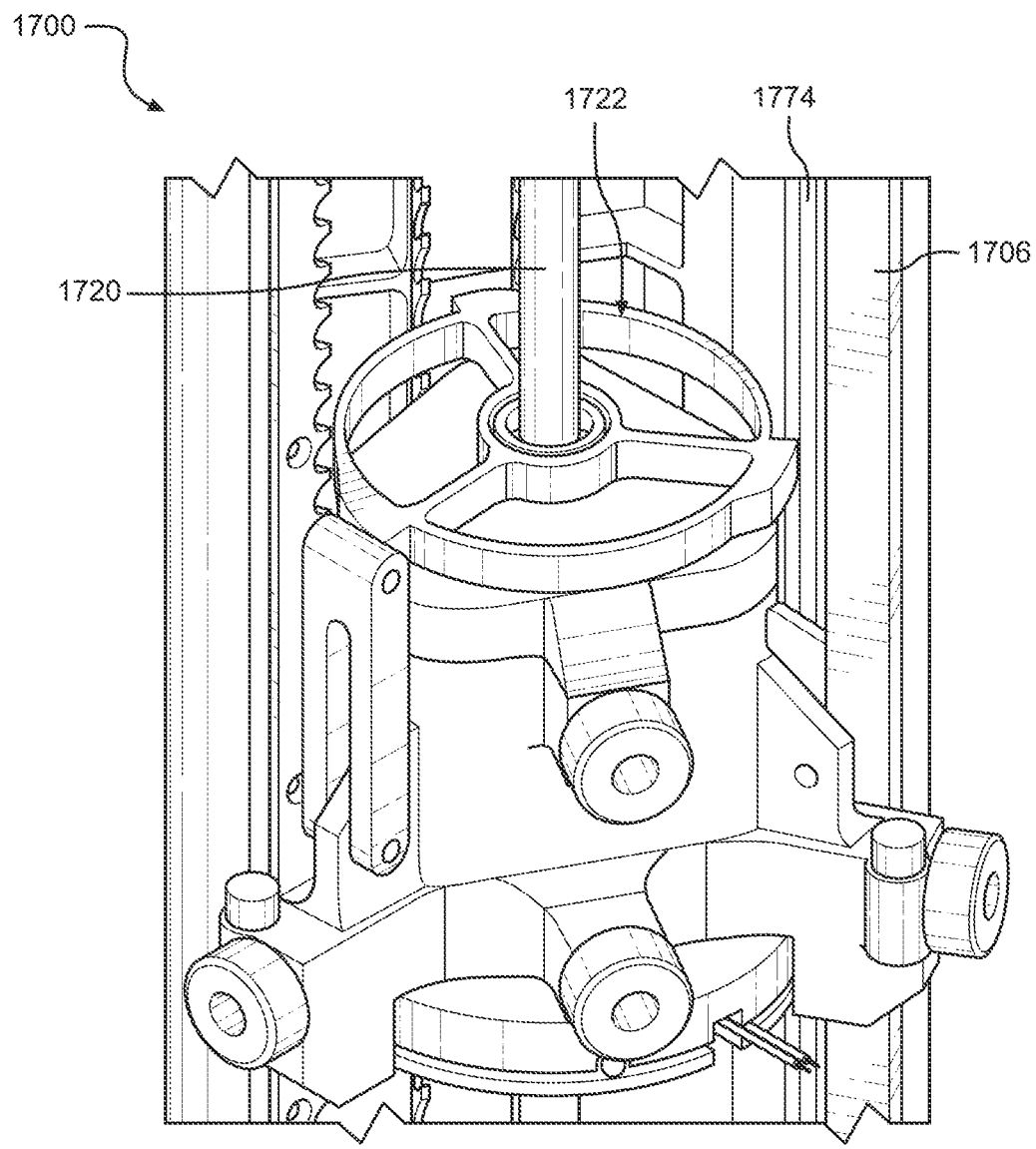
FIG. 17 is a diagram of a portion of an example litter platform support and positioning system in accordance with aspects of the present disclosure.

FIG. 17 is a diagram of a portion of an example litter platform support and positioning system 1700 in accordance with aspects of the present disclosure. The system 1700 includes a power strip 1774 positioned within the column cover 1716 proximate the tracks 1730 to provide power to the at least one carriage system 1722.

Figure 18:
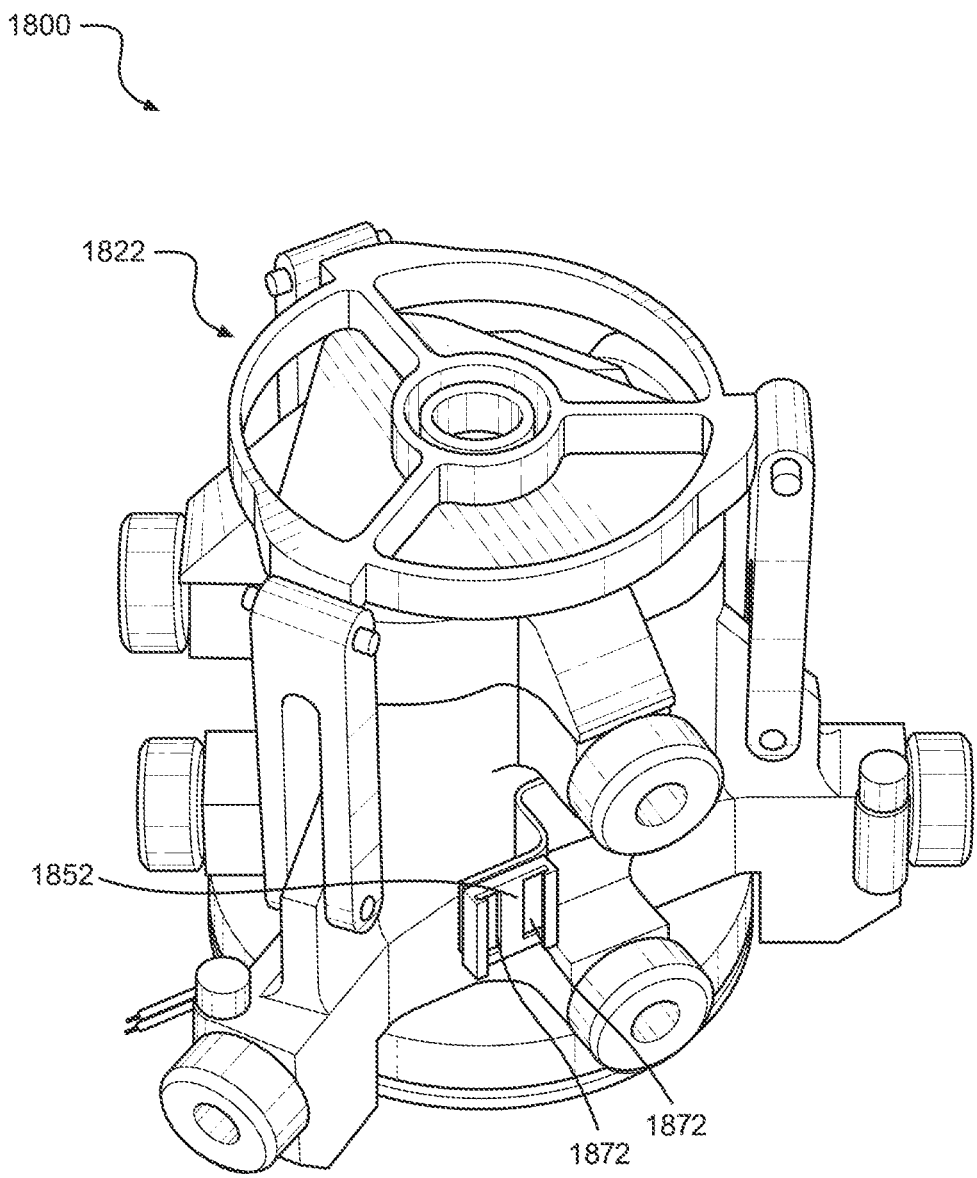
FIG. 18 is a diagram of a portion of an example litter platform support and positioning system in accordance with aspects of the present disclosure.

FIG. 18 is a diagram of a portion of an example litter platform support and positioning system 1800 in accordance with aspects of the present disclosure. As shown in FIG. 18, the system 1800 includes an electrical pick up unit 1152 that electrically interfaces with the power strip 1774 (shown in FIG. 17) to power the at least one carriage system 1822. The power strip 1774 (shown in FIG. 17) is electrically coupled to a power source (not show) and the electrical pick up unit 1852 includes a plurality of electrodes 1872 that interface with the power strip 1774 to power the at least one carriage system 1822. The electrodes 1872 are configured to electrically interface with the power strip 1774 (shown in FIG. 17) while also sliding along the power strip 1774 (shown in FIG. 17) to enable the at least one carriage system 1822 to receive electrical power while the at least one carriage system 1822 is raised and lowered within the column cover (not shown).

As shown in FIGS. 11-18, systems 1100-1800 may have four degrees of freedom—vertical, lateral, longitudinal, and rotational translation to allow maximum access to the entire patient in confined spaces. Additionally, the systems 1100-1800 may include smart devices/controllers that automatically control the systems 1100-1800. For example, the systems 1100-1800 may include controllers that maintain the litters 1102-1802 a predetermined distance from each other to prevent the litters 1102-1802 from colliding with each other.

Figure 19:
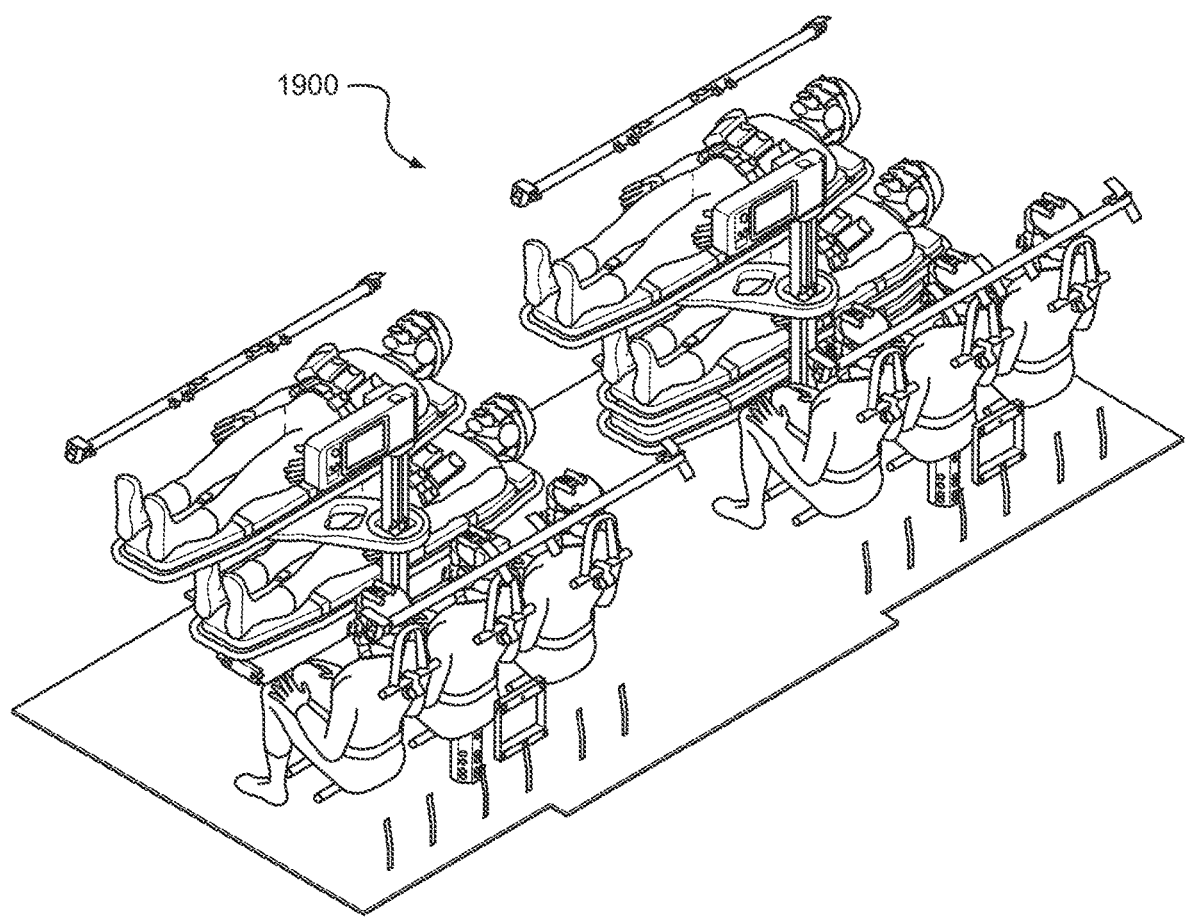
FIG. 19 is a diagram of an example litter platform support and positioning system in accordance with aspects of the present disclosure.

FIG. 19 is a diagram of an example litter platform support and positioning system 1900 in accordance with aspects of the present disclosure. As shown in FIG. 19, the system 1900 may be positioned within a vehicle and the vehicle may include a plurality of systems 1900 to accommodate a plurality of patients.

Figure 20:
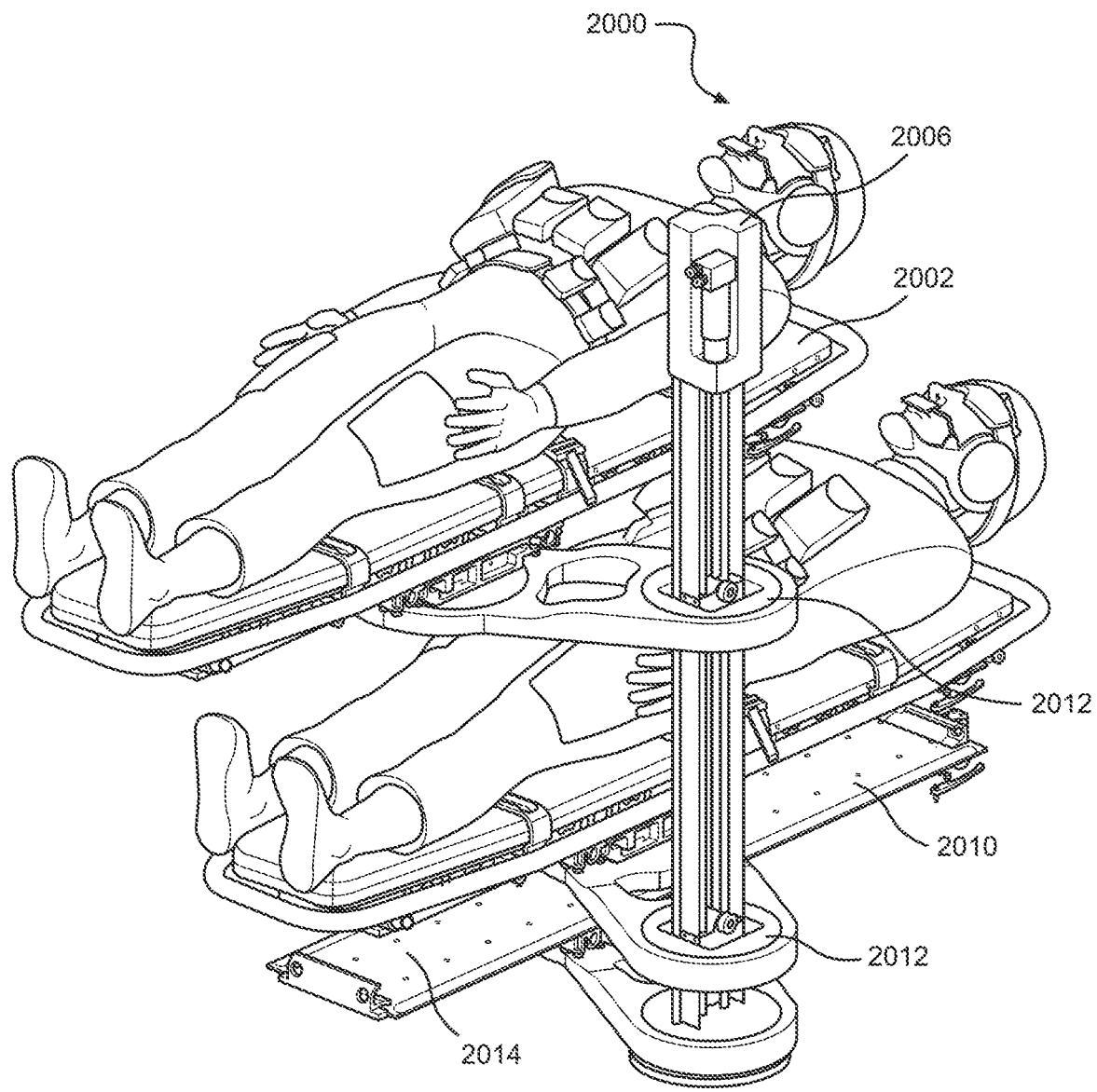
FIG. 20 is a diagram of an example litter platform support and positioning system in accordance with aspects of the present disclosure.

FIG. 20 is a diagram of an alternative embodiment of a lifter platform support and positioning system 2000 in accordance with aspects of the present disclosure is shown. A litter 2002 supporting a patient may be loaded onto at least one litter support assembly 2010 on the system 2000. In some implementations, the litter 2002 may be a wide patient litter with loading wheels. The litter may be loaded directly onto the litter support assembly 2010 or the litter may be attached to a litter assembly, and the litter assembly may be loaded onto the litter support assembly 2010. The litter assembly may be a Translating Patient Loading System (TPLS).

Figure 21:
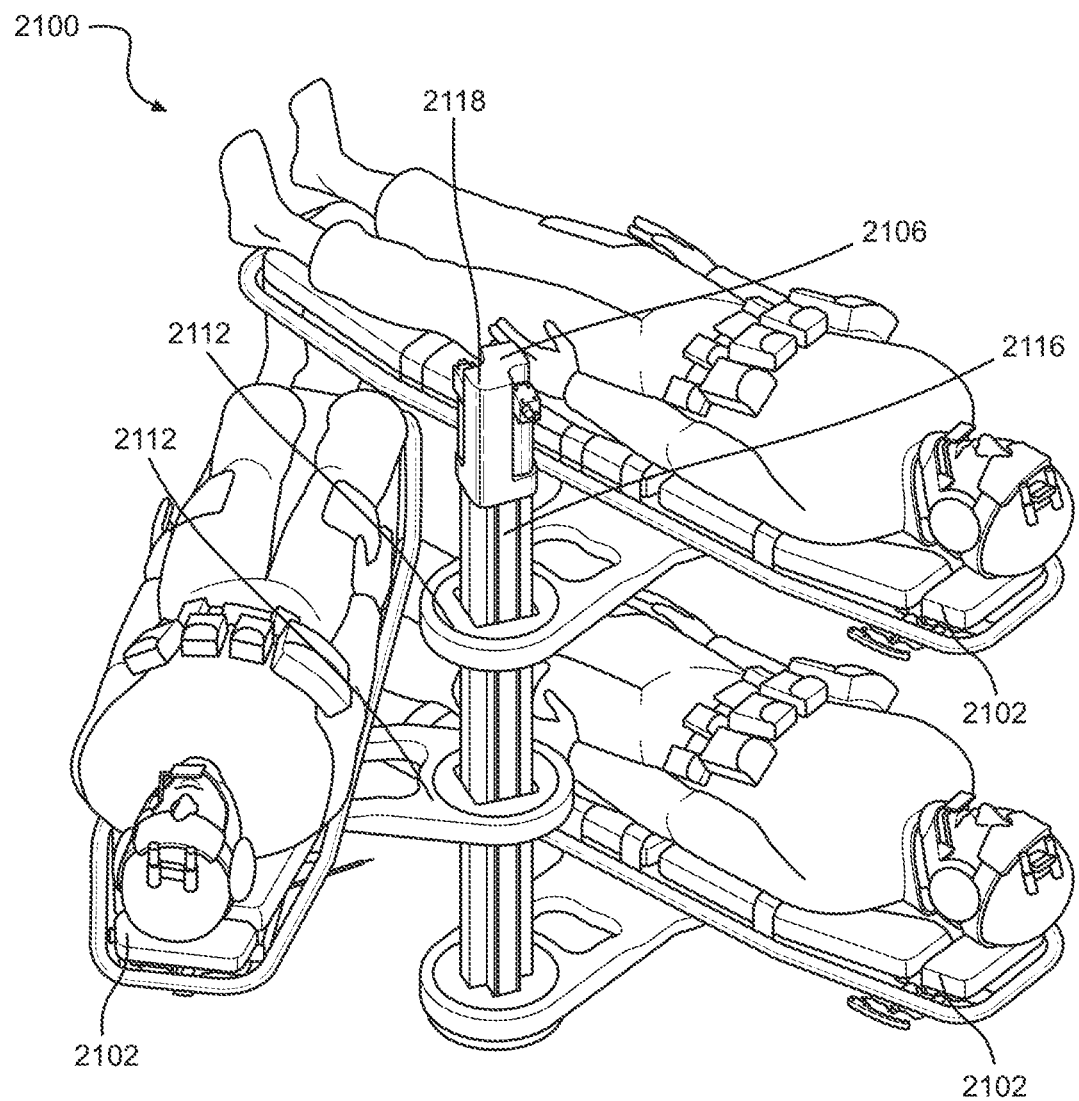
FIG. 21 is a diagram of an example litter platform support and positioning system in accordance with aspects of the present disclosure.

FIG. 21 is a diagram of an alternative embodiment of a lifter platform support and positioning system 2100 in accordance with aspects of the present disclosure is shown. The litter platform support and positioning system 2100 includes a lift column 2106 and at least one litter support assembly 2110 attached to the lift column 2106. In the illustrated embodiment, the system 2100 includes three litter support assemblies 2110 attached to the lift column 2106. In alternative embodiments, the system 2100 may include any number of litter support assemblies 2110 that enable the system 2100 to operate as described herein. Each litter support assembly 2110 includes a carousel 2112 and a litter platform 2114. The carousel 2112 movably attaches the litter platform 2114 to the lift column 2106 to enable the litter platform 2114, and a patient on the litter platform 2114, to be raised or lowered as needed. More specifically, as described herein, the lift column 2106 includes internal components that enable the lift column 2106 to selectively raise and lower the litter support assemblies 2110.

Figure 22:
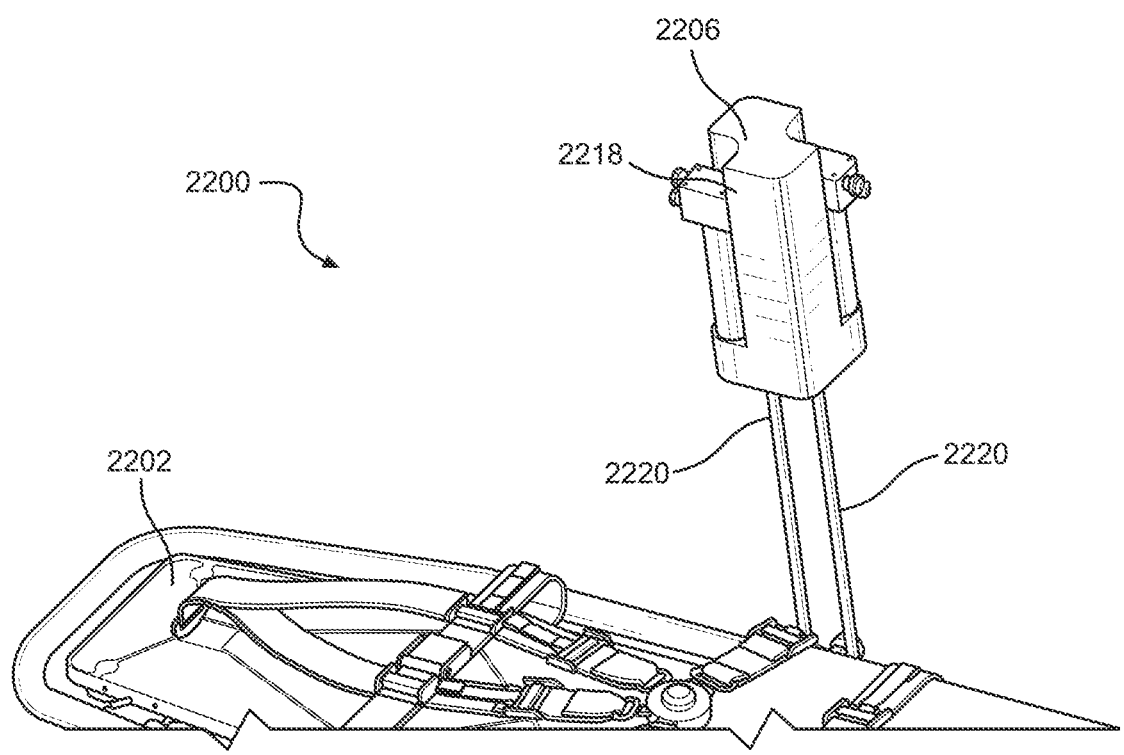
FIG. 22 is a diagram of a portion of an example litter platform support and positioning system in accordance with aspects of the present disclosure.

FIG. 22 is a diagram of an alternative embodiment of a lifter platform support and positioning system 2200 in accordance with aspects of the present disclosure is shown. A lift column 2206 includes a column cover (not shown), motors 2218, and ball screws 2220. The column cover (not shown) houses the motors 2218 and the ball screws 2220. The motors 2218 are housed in an upper portion 2228 of the column cover (not shown) and are rotatably attached to the ball screws 2220. The ball screws 2220 extends through the column cover (not shown) and are rotatably attached to the at least one carriage system (not shown).

Figure 23:
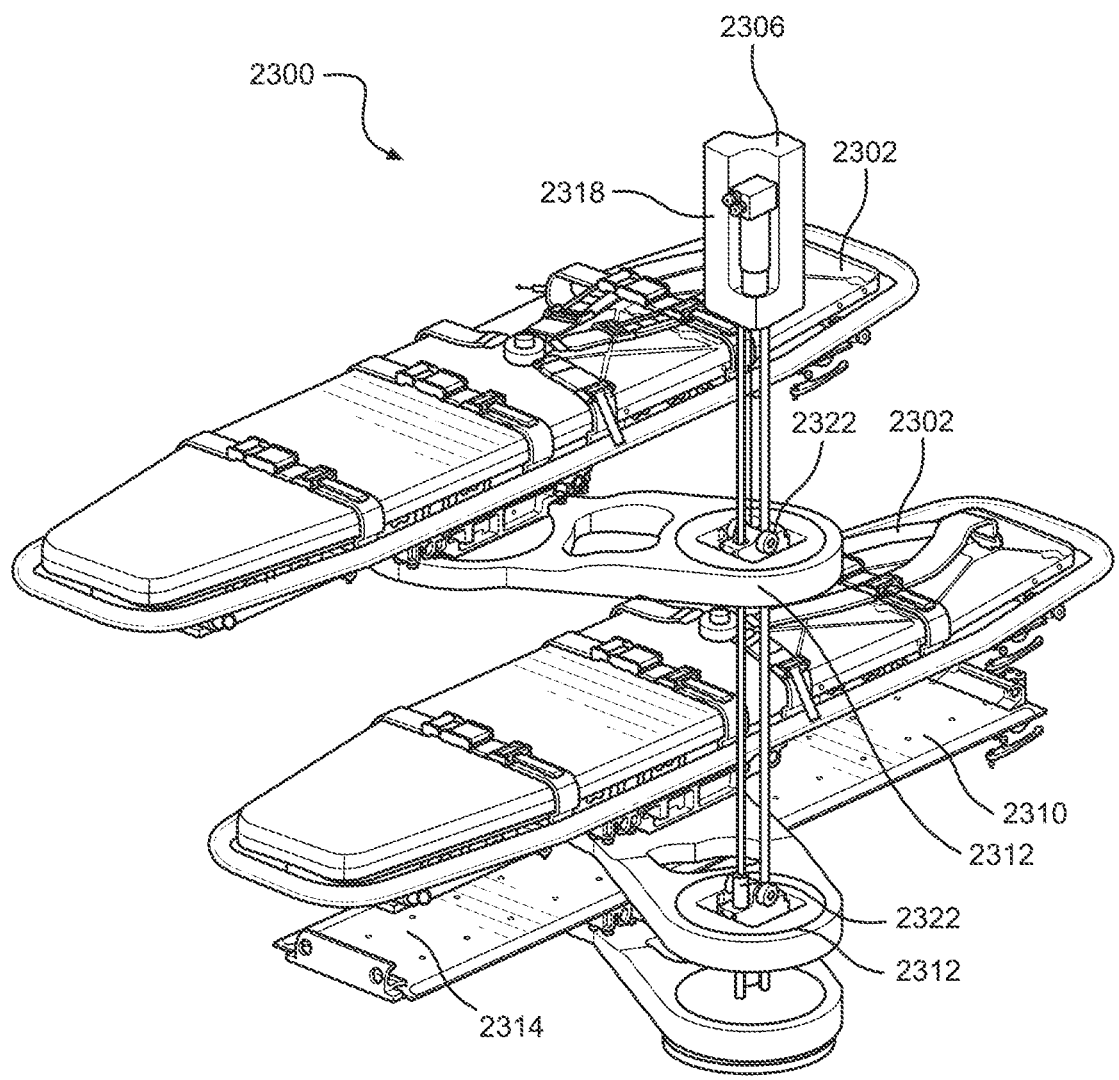
FIG. 23 is a diagram of a portion of an example litter platform support and positioning system in accordance with aspects of the present disclosure.

FIG. 23 is a diagram of an alternative embodiment of a litter platform support and positioning system 2300 in accordance with aspects of the present disclosure is shown. Referring to FIG. 23, a lift column 2306 includes a column cover 2316, motors 2318, ball screws 2320, and at least one carriage system 2322. The column cover (not shown) houses the motors 2318, the ball screws 2320, and the at least one carriage system 2322. The motors 2318 are housed in an upper portion 2328 of the column cover 2316 and are rotatably attached to the ball screws 2320. The ball screws 2320 extends through the column cover 2316 and are rotatably attached to the at least one carriage system 2322. The at least one carriage system 2322 is attached to the carousel 2312 to enable the litter platform 2314, and a patient on the litter platform 2314, to be raised or lowered as needed.

During operations, the motors 2318 each rotate a respective ball screw 2320 and the ball screws 2320 each raise or lower a respective carriage system 2322. The at least one carriage system 2322 is attached to the carousel 2312 and the litter platform 2314 and raises and lowers the carousel 2312 and the litter platform 2314. Specifically, as described herein, the ball screws 2320 selectively interact with a respective carriage system 2322 to raise and lower the respective carriage system 2322, carousel 2312, and litter platform 2314.

Figure 24:
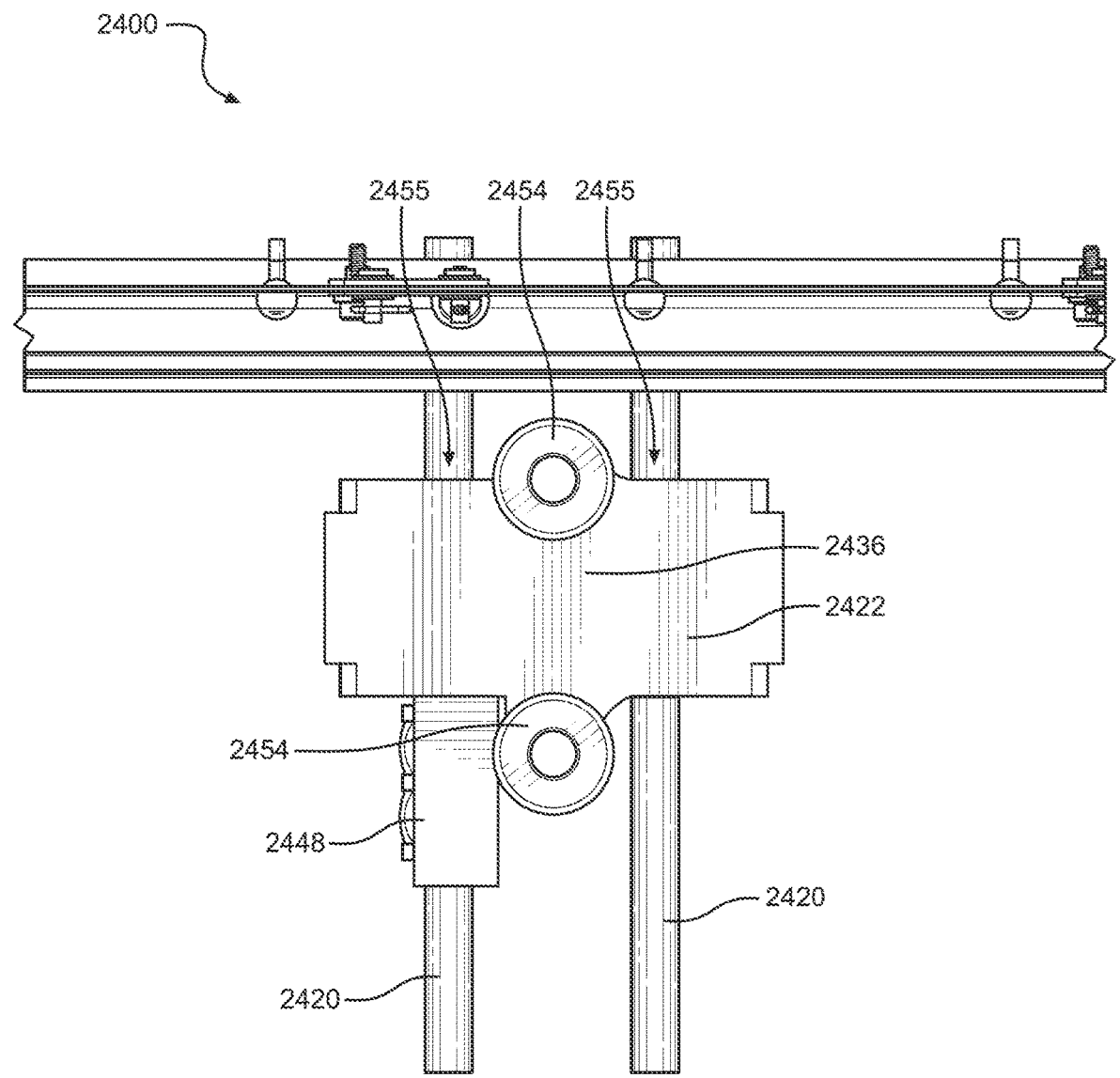
FIG. 24 is a diagram of a portion of an example litter platform support and positioning system in accordance with aspects of the present disclosure.

FIG. 24 is a diagram of an alternative embodiment of a litter platform support and positioning system 2400 in accordance with aspects of the present disclosure is shown. The at least one carriage system 2422 includes a housing 2436 and a ball nut 2448. The housing includes attachments 2454 that attach the least one carriage system 2422 to the carousel 2412, and the housing 2436 is attached to the ball nut 2448. The housing 2436 also defines two holes 2455 that circumscribe each of the ball screws 2420, and the ball nut 2448 interfaces with a respective ball screw 2420.

The ball screw 2420 and the ball nut 2448 raise and lower the at least one carriage system 2422 within the column cover 2416. Specifically, the at least one carriage system 2422 engages the ball nut 2448 such that rotation of the respective ball screw 2420 raises and lowers the at least one carriage system 2422. More specifically, the respective ball screw 2420 and the ball nut 2448 are a mechanical linear actuator that translates rotational motion of the ball screw 2420 to linear motion of the ball nut 2448 and the at least one carriage system 2422. The ball screw 2420 is a threaded shaft that includes a helical raceway that rotates as a respective motor 2418 rotates the ball screw 2420. The ball nut 2448 includes a plurality of ball bearings that selectively interface with the helical raceway of the threaded shaft of the ball screw 2420 to raise and lower the at least one carriage system 2422. The ball nut 2448 is electrically engaged and disengaged such that the at least one carriage system 2422 is selectively raised and lowered. As such, the ball screw 2420 and the ball nut 2448 enable the litter support assemblies 2410 to be individually raised and lowered.

As shown in FIGS. 19-24, systems 1900-2400 may have four degrees of freedom—vertical, lateral, longitudinal, and rotational translation to allow maximum access to the entire patient in confined spaces. Additionally, the systems 1900-2400 may include smart devices/controllers that automatically control the systems 1900-2400. For example, the systems 1900-2400 may include controllers that maintain the litters 1902-2402 a predetermined distance from each other to prevent the litters 1902-2402 from colliding with each other.

Figure 25:
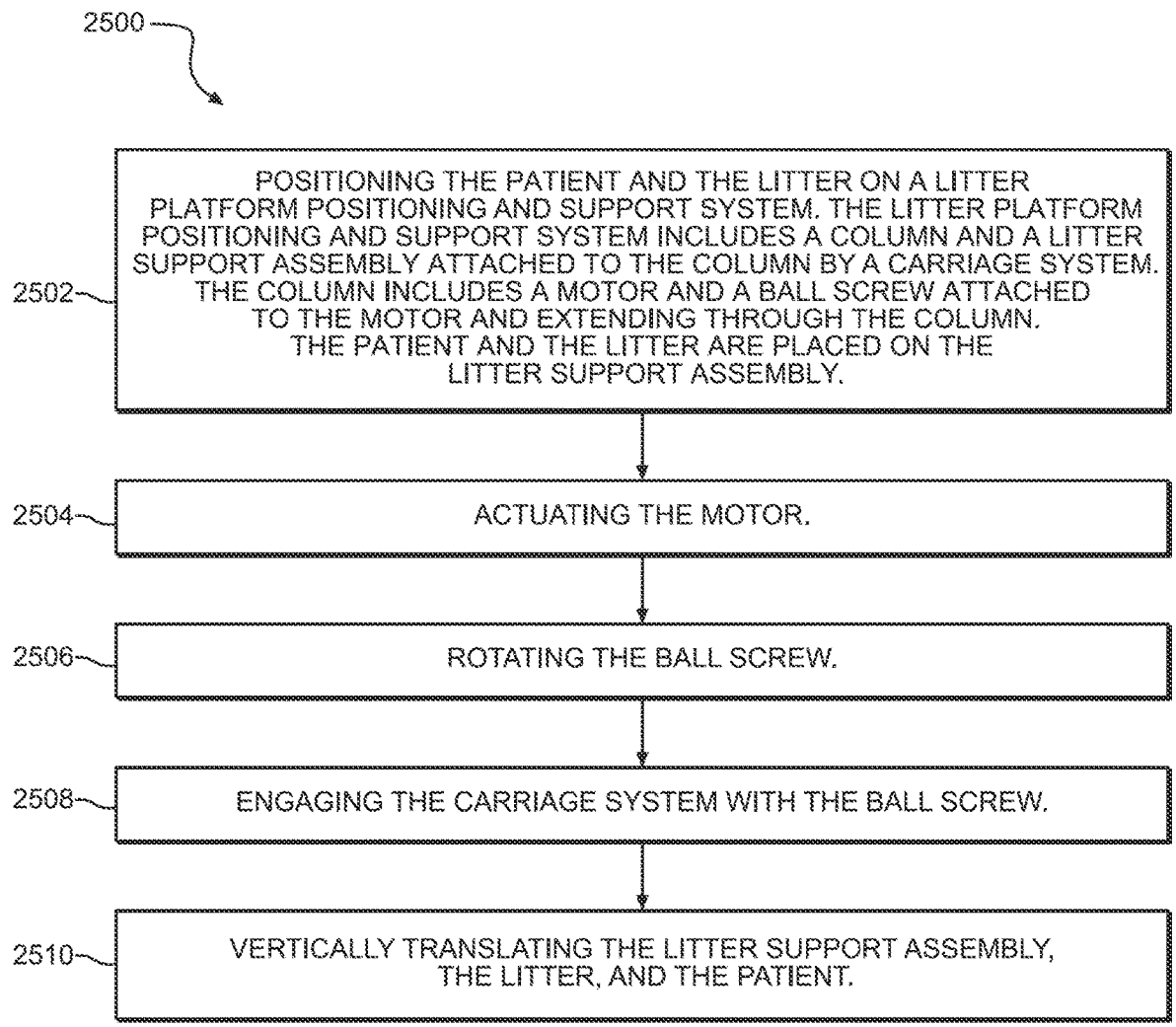
FIG. 25 is a flow diagram of a method of raising and lowering a patient on a litter.

FIG. 25 is a flow diagram of a method 2500 of raising and lowering a patient on a litter. The method 2500 includes positioning 2502 the patient and the litter on a litter platform positioning and support system. The litter platform positioning and support system includes a column and a litter support assembly attached to the column by a carriage system. The column includes a motor and a ball screw attached to the motor and extending through the column. The patient and the litter are placed on the litter support assembly. The method 2500 also includes actuating 2504 the motor. The method 2500 further includes rotating 2506 the ball screw. The method 2500 also include engaging 2508 the carriage system with the ball screw. The method 2500 further includes vertically translating 2510 the litter support assembly, the litter, and the patient.

In some implementations, the disclosed litter platform support and positioning system may also be used in mass casualty post-care. For example, where resources have been exhausted in mass casualty situations, the disclosed litter platform support and positioning system may be used for temporary storage of deceased patients when hospitals and funeral homes are over capacity, or otherwise, unavailable. For example, if the disclosed litter platform support and positioning system are implemented in storage rooms, storage containers, refrigerated trucks, hospitals, or funeral homes, the bodies of deceased patients may be temporarily placed in the disclosed litter platform support and positioning system.

In some implementations, the litter platform support and positioning system may be used with a Future Vertical Lift (FVL)/Medium and Large Rotary & Fixed Wing/Ground Transportation. For example, the litter platform support and positioning system may be used with a Future Vertical Lift is a non-traditional means to transport a patient such as drones and new non-rotor aircraft.

In some implementations, the litter platform support and positioning system may include a railed system. For example, the litter platform support and positioning system may be used with floor, side wall, and ceiling mounting rails are provided to provide the maximum amount of flexibility to locate and secure equipment.

The litter platform support and positioning system may include a patient handling/loading system (PHS/PLS) with four degrees of freedom—vertical, lateral, longitudinal, and rotational translation to allow maximum access to the entire patient in confined spaces.

In some implementations, the litter platform support and positioning system may include Surgical Interventions (e.g., a surgical table), robotics, virtual reality. A single patient platform may be used to provide a dedicated location to perform more advanced life support procedures.

In some implementations, the litter platform support and positioning system may include litters and seating to include patient comfort, imbedded sensors, heating/cooling. Ambulatory patients may be monitored for comfort utilizing vital signs monitoring and reporting. Heating and cooling may be included for additional patient comfort or treatment.

In some implementations, the litter platform support and positioning system may include standup restraints. For example, there may be a harness tethered to a ceiling channel & auto-lock feature. These features can allow a caregiver to move about the vehicle with the seat belt restraint attached to allow access to patients and other medical equipment during transport. The caregiver may be tethered to the ceiling, floor, wall points or tracks or the seat to allow movement about the vessel.

In some implementations, the litter platform support and positioning system may include a fluid containment and management system, such as fluid traps, cleanouts and disinfection means. The system may be designed to be easily cleaned, and to contain fluids where possible to protect the transport vessel and patient vessel from contamination.

In some implementations, the litter platform support and positioning system may integrate and interface electrically and for data transmission capability (e.g., Bluetooth, Wi-Fi, wireless, USB, and encryption/compression technologies.

In some implementations, the litter platform support and positioning system may include oxygen/medical air/suction/ electrical/lighting medical systems or other main EMS advanced life support systems available for a medical transport mission. The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A litter platform positioning and support system, comprising:
    a lift column
    at least two litter platform assemblies;
    at least two litter support assemblies including drawer sliders and arms; each litter support assembly connected to a corresponding litter platform assembly, each litter support assembly adapted to translate the corresponding litter platform assembly on the drawer sliders laterally away from the lift column, and adapted to independently rotate the position of the corresponding litter platform assembly up to 360° on the drawer sliders;
    the lift column mounted to a floor and connected to the at least two litter platform assemblies; and
    an electric drive motor operatively coupled to and adapted to selectively engage and disengage a drive screw to rotate the drive screw to individually position each litter support
    assembly to adjust and control translation of the corresponding litter platform assembly.

2. The system of claim 1, wherein the at least two litter support assemblies are further adapted to independently adjust a corresponding litter platform assembly in a vertical position.

3. The system of claim 1, wherein the at least two litter support assemblies are further connected to a corresponding litter platform assembly and adapted to independently adjust a portion of a backboard of a corresponding litter platform assembly in a tilted position.

4. The system of claim 1, wherein the electric drive motor is operatively coupled to each drive screw for rotating the drive screw to individually position each litter support assembly to independently adjust and control the elevation of each litter platform assembly.

5. The system of claim 1, wherein the electric drive motor is operatively coupled to each drive screw for rotating the drive screw to individually position each litter support assembly to independently adjust and control an axial rotation of each litter platform assembly.

6. The system of claim 1, wherein each litter support assembly includes a mounting tray.

7. The system of claim 1, further comprising:
a carrier block attaching the litter support assembly to a drive screw and lift column rails.

8. The system method of claim 1, wherein the lift column includes a spring curtain to cover moving parts internal to the lift column.

9. The system of claim 1, wherein the lift column includes end blocks located at both ends of the lift column.

10. The system of claim 1, wherein the lift column is mounted to a floor of a vehicle.

11. The system of claim 1, wherein the vehicle is one of a helicopter, an airplane, an ambulance, a truck, a container, a trailer, and a room.

12. The system of claim 1, wherein the lift column is mounted to an interior floor and connected to the at least two litter support assemblies and operatively coupled to the arms.

13. An emergency medical vehicle system comprising:
a vehicle: and
a litter platform positioning and support system, the litter platform positioning and support system including:
a lift column
at least two litter platform assemblies:
at least two support assemblies including drawer sliders and arms, each litter support assembly connected to a corresponding litter platform assembly, adapted to translate the corresponding litter platform assembly on the drawer sliders laterally away from the lift column, and adapted to independently rotate the position of the corresponding litter platform assembly up to 360° on the drawer sliders
the lift column mounted to a floor of the vehicle and connected to the at least two support assemblies; and
an electric drive motor operatively coupled to and adapted to selectively engage and disengage a drive screw to rotate the drive screw to individually position each litter support assembly to adjust and control the translation the corresponding litter platform assembly.

14. The system of claim 13, wherein the vehicle is one of a helicopter, an airplane, and an ambulance.

15. The system of claim 13, wherein the lift column is mounted to a floor and connected to the at least two litter support assemblies and operatively coupled to the arms.

16. A multi-patient lift system comprising:
a lift column
a plurality of litter platform assemblies;
a plurality of carriage systems, each carriage system connected to a corresponding litter support assembly including drawer sliders and arms adapted to translate the corresponding litter platform assembly on the drawer sliders laterally away from the lift column, and adapted to independently rotate a position of the corresponding litter platform assembly up to 360° on the drawer sliders; the lift column mounted to a vehicle and connected to the plurality of carriage systems; and
an electric drive motor operatively coupled to and adapted to selectively engage and disengage a drive screw to individually position each carriage system to adjust and control translation of the corresponding litter support assembly.

17. The system of claim 16, wherein the lift column includes a single drive screw rotationally connected to the plurality of carriage systems, wherein rotation of the drive screw selectively controls the location of each carriage system to individually position the corresponding carriage system.

18. The system of claim 17, wherein each carriage system includes a ball nut that selectively engages the drive screw to selectively control the location of each carriage system to individually position the corresponding carriage system.

* * * * *